US009005477B2

(12) United States Patent
Kuriyama et al.

(10) Patent No.: US 9,005,477 B2
(45) Date of Patent: Apr. 14, 2015

(54) LIQUID CRYSTAL COMPOSITION CONTAINING POLYMERIZABLE COMPOUND AND LIQUID CRYSTAL DISPLAY ELEMENT USING THE SAME

(75) Inventors: Takeshi Kuriyama, Saitama (JP); Shinichi Hirata, Saitama (JP); Syoutaro Kawakami, Saitama (JP)

(73) Assignee: DIC Corporation, Tokyo (JP)

( * ) Notice: Subject to any disclaimer, the term of this patent is extended or adjusted under 35 U.S.C. 154(b) by 171 days.

(21) Appl. No.: 13/515,400

(22) PCT Filed: Nov. 24, 2010

(86) PCT No.: PCT/JP2010/070850
§ 371 (c)(1),
(2), (4) Date: Aug. 3, 2012

(87) PCT Pub. No.: WO2011/074384
PCT Pub. Date: Jun. 23, 2011

(65) Prior Publication Data
US 2012/0292567 A1    Nov. 22, 2012

(30) Foreign Application Priority Data
Dec. 14, 2009   (JP) .................. 2009-282774

(51) Int. Cl.
| C09K 19/32 | (2006.01) |
| C09K 19/06 | (2006.01) |
| C09K 19/34 | (2006.01) |
| C09K 19/52 | (2006.01) |
| C09K 19/02 | (2006.01) |
| C09K 19/04 | (2006.01) |
| G02F 1/137 | (2006.01) |

(52) U.S. Cl.
CPC ........ *C09K 19/322* (2013.01); *C09K 2019/0448* (2013.01); *G02F 2001/13775* (2013.01)

(58) Field of Classification Search
USPC ............... 252/299.01, 299.6, 299.62, 299.63, 252/299.64, 299.65, 299.66, 299.67; 428/1.1, 1.2
See application file for complete search history.

(56) References Cited

U.S. PATENT DOCUMENTS 7,919,009 B2 *   4/2011   Itano et al. ................. 252/299.6

FOREIGN PATENT DOCUMENTS

WO    WO 2009/104468 A1 *   8/2009   ......... C09K 19/2007

\* cited by examiner

*Primary Examiner* — Geraldina Visconti
(74) *Attorney, Agent, or Firm* — Westerman, Hattori, Daniels & Adrian, LLP

(57) ABSTRACT

A liquid crystal composition containing a polymerizable compound according to the present invention is used in a liquid crystal display element in which a liquid crystal alignment capability is provided through polymerization. The liquid crystal composition contains a polymerizable compound that polymerizes without a photopolymerization initiator or with an extremely small amount of photopolymerization initiator. Therefore, the alignment properties after the polymerization become more stable and the display characteristics do not degrade. Thus, the polymerizable compound is suitable as a practical component of the liquid crystal composition. A liquid crystal display element that uses the liquid crystal composition containing a polymerizable compound according to the present invention can be suitably used for VA and IPS liquid crystal display elements.

8 Claims, No Drawings

LIQUID CRYSTAL COMPOSITION CONTAINING POLYMERIZABLE COMPOUND AND LIQUID CRYSTAL DISPLAY ELEMENT USING THE SAME

TECHNICAL FIELD

The present invention relates to a liquid crystal composition containing a polymerizable compound and to a liquid crystal display element using the liquid crystal composition.

BACKGROUND ART

PSA (polymer sustained alignment) liquid crystal display devices have a structure in which a polymer structure is formed in a cell in order to control the pretilt angle of liquid crystal molecules. Because of their high-speed responsivity and high contrast, PSA liquid crystal display devices are expected to become next-generation liquid crystal display elements.

To put such PSA liquid crystal display elements to practical use, a problem of "image sticking" caused when a certain image is continuously displayed for a long time needs to be addressed. The cause of image sticking is not simple, and image sticking occurs due to multiple factors. Image sticking is mainly caused by (1) a polymerizable compound left after polymerization, (2) a residual polymerization initiator, and (3) a change in the alignment of liquid crystal molecules (change in pretilt angle).

Such a PSA liquid crystal display element is produced by injecting a polymerizable composition containing a liquid crystal compound and a polymerizable compound between substrates and polymerizing the polymerizable compound while liquid crystal molecules are being aligned by applying a voltage to fix the alignment of the liquid crystal molecules. If the polymerization is not completed and an unpolymerized polymerizable compound is left, image sticking caused by the unpolymerized polymerizable compound occurs. Therefore, the polymerizable compound in the liquid crystal composition needs to be completely polymerized as much as possible to reduce the amount of unpolymerized polymerizable compound.

To facilitate polymerization, it is effective to add a polymerization initiator. However, in existing liquid crystal compositions containing a polymerizable compound, a large amount of polymerization initiator needs to be added in order to reduce the amount of unpolymerized polymerizable compound to the degree that image sticking is prevented. In this case, the voltage-holding ratio of the resultant display element is decreased by the residual polymerization initiator, which results in an adverse effect on the display quality. If a small amount of polymerization initiator is added in order to reduce the amount of residual polymerization initiator and suppress the decrease in a voltage-holding ratio, an unpolymerized polymerizable compound is left because the polymerization does not completely proceed, and thus image sticking due to the unpolymerized polymerizable compound inevitably occurs.

In order to reduce the amount of unpolymerized polymerizable compound by completely curing a polymerizable compound with a small amount of polymerization initiator added, a method of applying a large amount of energy may be employed, the method specifically being performed by applying strong ultraviolet light for a long time in a polymerization process. In this case, however, in addition to an increase in the size of the production apparatus and a decrease in the production efficiency, for example, degradation of the liquid crystal material due to ultraviolet light is caused. Thus, in existing liquid crystal compositions containing a polymerizable compound, it is difficult to reduce both the amount of unpolymerized polymerizable compound and the amount of residual polymerization initiator at the same time. Accordingly, it has been desired to develop a liquid crystal composition containing a polymerizable compound that is completely polymerized without using a polymerization initiator.

It is also known that image sticking is caused by a change in the pretilt angle of liquid crystal molecules in a liquid crystal composition containing a polymerizable compound. Specifically, in the case where a display element is constituted by a flexible polymer, which is obtained by curing a polymerizable compound, when a certain pattern is continuously displayed for a long time, the structure of the polymer changes, resulting in a change in pretilt angle. Since such a change in pretilt angle causes image sticking, it is necessary to use a polymerizable compound capable of forming a polymer that has a rigid polymer structure which does not change.

Hitherto, in order to prevent image sticking by improving the rigidity of a polymer, a display element has been constituted by using a polymerizable compound having a structure such as a 1,4-phenylene group having only a ring structure and polymerizable functional groups (refer to PTL 1) and a display element has been constituted by using a polymerizable compound having a biaryl structure (refer to PTL 2). However, these polymerizable compounds have low compatibility with liquid crystal compounds, and thus deposition of the polymerizable compounds occurs when a liquid crystal composition is prepared. Therefore, it is difficult to apply these polymerizable compounds to a practical liquid crystal composition.

In addition, in order to prevent image sticking by improving the rigidity of a polymer, it has been proposed that a display element be constituted by using a mixed liquid crystal composition containing a bifunctional polymerizable compound and a trifunctional or higher functional polymerizable compound such as dipentaerythritol pentaacrylate or dipentaerythritol hexaacrylate (refer to PTL 3). However, since dipentaerythritol pentaacrylate and dipentaerythritol hexaacrylate have no ring structure in their molecules, the affinity of these polymerizable compounds with liquid crystal compounds is weak and a force that controls alignment is also weak. Accordingly, sufficient alignment stability is not achieved. Furthermore, it is essential to add a polymerization initiator in polymerization of these polymerizable compounds. If a polymerization initiator is not added, these polymerizable compounds are left after the polymerization.

As described above, it is difficult to satisfy characteristics required in liquid crystal compositions containing a polymerizable compound, such as image sticking characteristics of a display element, alignment stability, stability of a composition having such a property that no deposition is produced, and the production efficiency in the fabrication of a PSA liquid crystal display element. This difficulty inhibits the practical use of the display element.

CITATION LIST

Patent Literature

PTL 1: Japanese Unexamined Patent Application Publication No. 2003-307720
PTL 2: Japanese Unexamined Patent Application Publication No. 2008-116931

SUMMARY OF INVENTION

Technical Problem

It is an object of the present invention to provide a liquid crystal composition containing a polymerizable compound in which even when a polymerizable compound is polymerized without using a polymerization initiator or with an extremely small amount of polymerization initiator, the polymerizable compound is not left or is left in an extremely small amount. It is another object of the present invention to provide a liquid crystal composition containing a polymerizable compound in which a polymerizable compound is satisfactorily compatible with liquid crystal materials, alignment properties are more stable after polymerization, and display characteristics do not degrade. Furthermore, it is another object of the present invention to provide a liquid crystal display element to which a liquid crystal alignment capability is provided by polymerizing the liquid crystal composition containing a polymerizable compound and which has high display performance.

PTL 3: Japanese Unexamined Patent Application Publication No. 2004-302096

Solution to Problem

As a result of research on various polymerizable compounds and various non-polymerizable liquid crystal materials, the inventors of the present invention have found that the above-described objects can be achieved by using a liquid crystal composition containing a polymerizable compound, the composition being composed of a polymerizable compound having a certain structure and a non-polymerizable liquid crystal material, and the inventors have completed the present invention.

There is provided a liquid crystal composition containing a polymerizable compound, including:

as a first component, at least one compound selected from polymerizable compounds represented by general formula (I)

[Chem. 1]

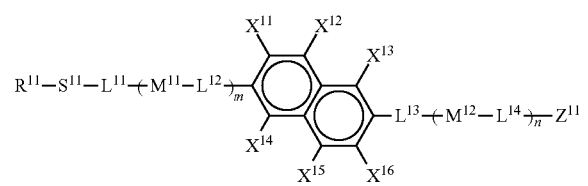

(I)

(wherein $R^{11}$ is selected from structures represented by formulae (R-1) to (R-15) below,

[Chem. 2]

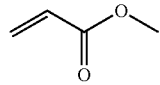   (R-1)

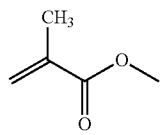   (R-2)

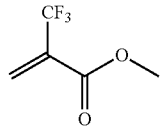   (R-3)

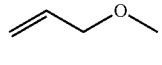   (R-4)

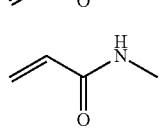   (R-5)

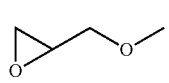   (R-6)

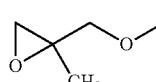   (R-7)

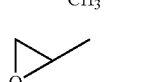   (R-8)

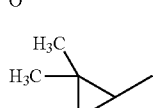   (R-9)

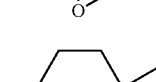   (R-10)

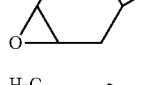   (R-11)

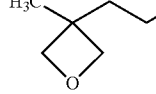   (R-12)

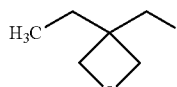   (R-13)

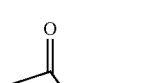   (R-14)

HS——   (R-15)

$S^{11}$ represents a single bond or an alkylene group having 1 to 12 carbon atoms, where a methylene group in the alkylene group may be substituted with an oxygen atom, —COO—, —OCO—, or —OCOO— as long as oxygen atoms are not directly bonded to each other, $Z^{11}$ represents a hydrogen atom, a fluorine atom, a chlorine atom, a cyano group, a thiocyanate group, a trifluoromethoxy group, a trifluoromethyl group, a difluoromethoxy group, an alkyl group having 1 to 12 carbon atoms, where a methylene group in the alkyl group may be substituted with an oxygen atom, a sulfur atom, —CO—, —COO—, —OCO—, —OCOO—, —CH=CH—, or —C≡C— as long as —O—O—, —O—S—, and —S—S— are not formed, or —S$^{12}$—R$^{12}$ (wherein R$^{12}$ independently has the same meaning as R$^{11}$, and S$^{12}$ independently has the same meaning as S$^{22}$), X$^{11}$, X$^{12}$, X$^{13}$, X$^{14}$, X$^{15}$, and X$^{16}$ each independently represent a hydrogen atom, an alkyl group, an alkyl halide group, an alkoxy group, an alkoxy halide group, a halogen, a cyano group, or a nitro group, m represents 0 or 1 and n represents 1, 2, or 3, L$^{11}$, L$^{12}$, and L$^{14}$ each independently represent a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —CO—NR$^a$—, —NR$^a$—CO—, —SCH$_2$—, —CH$_2$S—, —CH=CH—COO—, —COO—CH=CH—, —OCO—CH=CH—, —CH=CH—OCO—, —COOC$_2$H$_4$—, —OCOC$_2$H$_4$—, —C$_2$H$_4$COO—, —C$_2$H$_4$COO—, —OCOCH$_2$—, —CH$_2$COO—, —CH—CH—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— (wherein R$^a$ represents an alkyl group having 1 to 4 carbon atoms), and when a plurality of L$^{12}$s are present, L$^{12}$s may be the same as or different from each other, and when a plurality of L$^{14}$s are present, L$^{14}$s may be the same as or different from each other, L$^{13}$ represents —CH=CQ-COO—, —CH=CQ—OCO—, —COO-CQ=CH—, or —OCO—CQ=CH— (wherein Q represents a hydrogen atom or a methyl group), M$^{11}$ and M$^{12}$ each independently represent a 1,4-phenylene group, a 1,4-cyclohexylene group, a pyridine-2,5-diyl group, a pyrimidine-2,5-diyl group, a piperidine-2,5-diyl group, a naphthalene-2,6-diyl group, an indane-2,5-diyl group, a tetrahydronaphthalene-2,6-diyl group, or a 1,3-dioxane-2,5-diyl group, where hydrogen atoms in M$^{11}$ and M$^{22}$ may be each independently unsubstituted or substituted with a fluorine atom, a chlorine atom, a cyano group, an alkyl group having 1 to 8 carbon atoms, an alkyl halide group, an alkoxy halide group, an alkoxy group, or a nitro group, and when a plurality of M$^{11}$s are present, M$^{11}$s may be the same as or different from each other, and when a plurality of M$^{12}$s are present, M$^{11}$s may be the same as or different from each other);

as a second component, at least one compound represented by general formula (II)

[Chem. 3]

(II)

(wherein R$^{21}$ and R$^{22}$ each independently represent an alkyl group having 1 to 10 carbon atoms or an alkenyl group having 2 to 10 carbon atoms, where one methylene group or two or more methylene groups that are not adjacent to each other in these groups may be substituted with —O— or —S—, and at least one hydrogen atom in these groups may be substituted with a fluorine atom or a chlorine atom, o represents 0, 1, or 2, M$^{21}$, M$^{22}$, and M$^{23}$ each independently represent a group selected from (a) a trans-1,4-cyclohexylene group (one methylene group or two or more methylene groups that are not adjacent to each other in this group may be substituted with —O— or —S—), (b) a 1,4-phenylene group (one —CH= or two or more —CH= that are not adjacent to each other in this group may be substituted with a nitrogen atom), a 3-fluoro-1,4-phenylene group, and a 3,5-difluoro-1,4-phenylene group, and (c) a 1,4-cyclohexenylene group, a 1,4-bicyclo(2.2.2)octylene group, a piperidine-2,5-diyl group, a naphthalene-2,6-diyl group, a decahydronaphthalene-2,6-diyl group, and a 1,2,3,4-tetrahydronaphthalene-2,6-diyl group, and when a plurality of M$^{23}$s are present, M$^{23}$s may be the same as or different from each other, L$^{21}$ and L$^{22}$ each independently represent a single bond, —CH$_2$CH$_2$—, —(CH$_2$)$_4$—, —OCH$_2$—, —CH$_2$O—, —OCF$_2$—, —CF$_2$O—, —CH=CH—, —CH=N—N=CH—, or —C≡C—, and when a plurality of L$^{22}$s are present, L$^{22}$s may be the same as or different from each other); and as a third component, at least one compound selected from the group consisting of compounds represented by general formulae (IIIa), (IIIb), and (IIIc) or the group consisting of compounds represented by general formulae (IVa), (IVb), and (IVc)

[Chem. 4]

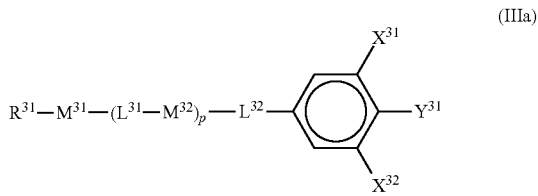

(IIIa)

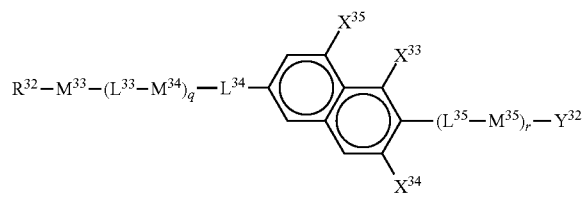

(IIIb)

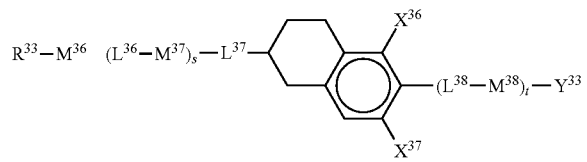

(IIIc)

(wherein R$^{31}$, R$^{32}$, and R$^{33}$ each independently represent an alkyl group having 1 to 10 carbon atoms or an alkenyl group having 2 to 10 carbon atoms, where one methylene group or two or more methylene groups that are not adjacent to each other in these groups may be substituted with —O— or —S—, and at least one hydrogen atom in these groups may be substituted with a fluorine atom or a chlorine atom, p, q, r, s, and t each independently represent 0, 1, or 2, where q+r and s+t are each 2 or less, M$^{31}$, M$^{32}$, M$^{33}$, M$^{34}$, M$^{35}$, M$^{36}$, M$^{37}$, and M$^{38}$ each independently represent a group selected from (d) a trans-1,4-cyclohexylene group (one methylene group or two or more methylene groups that are not adjacent to each other in this group may be substituted with —O— or —S—), (e) a 1,4-phenylene group (one —CH= or two or more —CH= that are not adjacent to each other in this group may be substituted with a nitrogen atom), a 3-fluoro-1,4-phenylene group, and a 3,5-difluoro-1,4-phenylene group, and (f) a 1,4-cyclohexenylene group, a 1,4-bicyclo(2.2.2)octylene group, a piperidine-2,5-diyl group, a naphthalene-2,6-diyl group, a 1,2,3,4-tetrahydronaphthalene-2,6-diyl group, and a decahydronaphthalene-2,6-diyl group, a hydrogen atom in the group (d), groups (e), or groups (f) may be substituted with a cyano group, a fluorine atom, a trifluoromethyl group, a trifluoromethoxy group, or a chlorine atom, and when a plurality of $M^{32}$s, $M^{34}$s, $M^{35}$s, $M^{37}$s, and/or $M^{38}$s are present, they may each be the same as or different from each other, $L^{31}$, $L^{32}$, $L^{33}$, $L^{34}$, $L^{35}$, $L^{36}$, $L^{37}$, and $L^{38}$ each independently represent a single bond, —OCO—, —OCO—, —CH$_2$CH$_2$—, —(CH$_2$)$_4$—, —OCH$_2$—, —CH$_2$O—, —OCF$_2$—, —CF$_2$O—, or —C≡C—, and when a plurality of $L^{31}$s, $L^{33}$s, $L^{35}$s, $L^{36}$s, and/or $L^{38}$s are present, they may each be the same as or different from each other, $X^{31}$, $X^{32}$, $X^{33}$, $X^{34}$, $X^{35}$, $X^{36}$, and $X^{37}$ each independently represent a hydrogen atom or a fluorine atom, $Y^{31}$, $Y^{32}$, and $Y^{33}$ each independently represent a fluorine atom, a chlorine atom, a cyano group, a thiocyanate group, a trifluoromethoxy group, a trifluoromethyl group, a 2,2,2-trifluoroethyl group, or a difluoromethoxy group),

[Chem. 5]

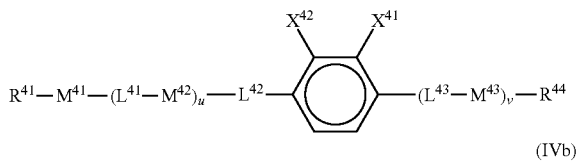

(IVa)

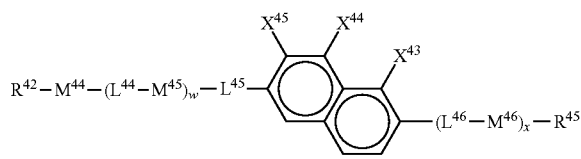

(IVb)

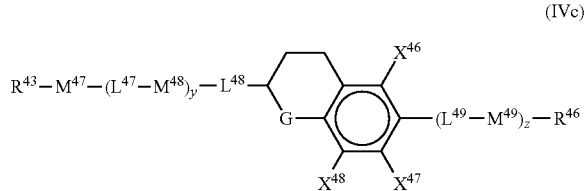

(IVc)

(wherein $R^{41}$, $R^{42}$, $R^{43}$, $R^{44}$, $R^{45}$, and $R^{46}$ each independently represent an alkyl group having 1 to 10 carbon atoms or an alkenyl group having 2 to 10 carbon atoms, where one methylene group or two or more methylene groups that are not adjacent to each other in these groups may be substituted with —O— or —S—, and at least one hydrogen atom in these groups may be substituted with a fluorine atom or a chlorine atom, u, v, w, x, y, and z each independently represent 0, 1, or 2, where u+v, w+x, and y+z are each 2 or less, $M^{41}$, $M^{42}$, $M^{43}$, $M^{44}$, $M^{45}$, $M^{46}$, $M^{47}$, $M^{48}$, and $M^{49}$ each independently represent a group selected from (d) a trans-1,4-cyclohexylene group (one methylene group or two or more methylene groups that are not adjacent to each other in this group may be substituted with —O— or —S—), (e) a 1,4-phenylene group (one —CH= or two or more —CH= that are not adjacent to each other in this group may be substituted with a nitrogen atom), and (f) a 1,4-cyclohexenylene group, a 1,4-bicyclo(2.2.2)octylene group, a piperidine-2,5-diyl group, a naphthalene-2,6-diyl group, a 1,2,3,4-tetrahydronaphthalene-2,6-diyl group, and a decahydronaphthalene-2,6-diyl group, a hydrogen atom in the group (d), group (e), or groups (f) may be substituted with a cyano group, a fluorine atom, a trifluoromethyl group, a trifluoromethoxy group, or a chlorine atom, and when a plurality of $M^{42}$s, $M^{43}$s, $M^{45}$s, $M^{46}$s, $M^{48}$s, and/or $M^{49}$s are present, they may each be the same as or different from each other, $L^{41}$, $L^{42}$, $L^{43}$, $L^{44}$, $L^{45}$, $L^{46}$, $L^{47}$, $L^{48}$, and $L^{49}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, or —C≡C—, and when a plurality of $L^{41}$s, $L^{43}$s, $L^{44}$s, $L^{46}$s, $L^{47}$s, and/or $L^{49}$s are present, they may each be the same as or different from each other, $X^{41}$ and $X^{42}$ each independently represent a trifluoromethyl group, a trifluoromethoxy group, or a fluorine atom and $X^{43}$, $X^{44}$, $X^{45}$, $X^{46}$, $X^{47}$, and $X^{48}$ each independently represent a hydrogen atom, a trifluoromethyl group, a trifluoromethoxy group, or a fluorine atom, but one of $X^{41}$ and $X^{42}$ represents a fluorine atom, one of $X^{43}$, $X^{44}$, and $X^{45}$ represents a fluorine atom, and one of $X^{46}$, $X^{47}$ and $X^{48}$ represents a fluorine atom, where $X^{46}$ and $X^{47}$ do not represent fluorine atoms at the same time and $X^{46}$ and $X^{48}$ do not represent fluorine atoms at the same time, G represents a methylene group or —O—). There is also provided a liquid crystal display element that uses the liquid crystal composition.

Advantageous Effects of Invention

Since the polymerizable compound, which is an essential component of the present invention, is highly compatible with other non-polymerizable liquid crystal materials, a stable liquid crystal composition can be obtained. The polymerizable compound includes a skeleton similar to that of liquid crystal compounds and thus has a strong alignment controlling force exerted on the liquid crystal compounds. In a liquid crystal composition containing the polymerizable compound, the polymerizable compound can be polymerized without using a photopolymerization initiator or with an extremely small amount of photopolymerization initiator, and an unpolymerized polymerizable compound is not left or is left in an extremely small amount after the polymerization. Furthermore, the energy required for polymerization of the polymerizable compound can be significantly reduced. Accordingly, the display failure of a PSA liquid crystal display element in which alignment is provided by polymerizing a polymerizable compound in a liquid crystal material is significantly reduced, and energy cost for production is reduced and production efficiency is improved. Therefore, the liquid crystal composition of the present invention is useful as a liquid crystal composition for the liquid crystal display element.

DESCRIPTION OF EMBODIMENTS

A polymerizable compound used in the liquid crystal composition containing a polymerizable compound according to the present invention is a compound represented by the general formula (I). In the general formula (I), $R^{11}$ represents a polymerizable group, and the following structures are exemplified as the polymerizable group.

[Chem. 6]

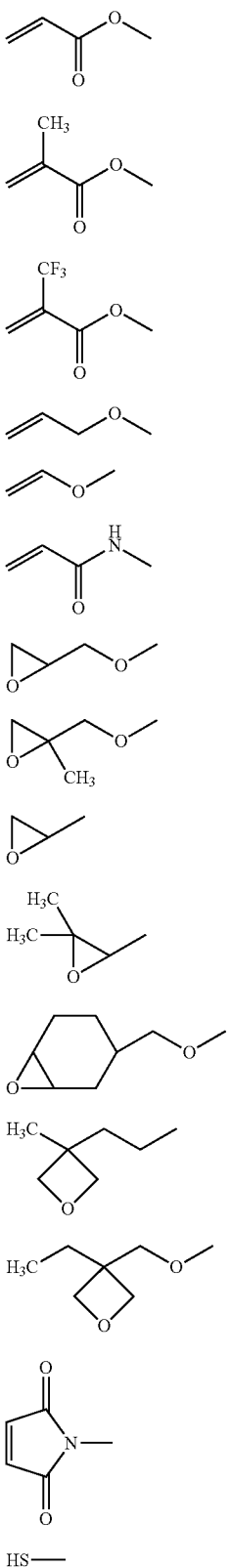

(R-1)
(R-2)
(R-3)
(R-4)
(R-5)
(R-6)
(R-7)
(R-8)
(R-9)
(R-10)
(R-11)
(R-12)
(R-13)
(R-14)
(R-15)

These polymerizable groups are cured by radical polymerization, radical addition polymerization, cationic polymerization, or anionic polymerization. In particular, when ultraviolet polymerization is employed as a polymerization method, formula (R-1), formula (R-2), formula (R-4), formula (R-5), formula (R-7), formula (R-11), formula (R-13), or formula (R-15) is preferred; formula (R-1), formula (R-2), formula (R-7), formula (R-11), or formula (R-13) is more preferred; and formula (R-1) or formula (R-2) is further preferred.

$S^{11}$ represents a spacer group or a single bond. The spacer group is preferably a single bond or an alkylene group having 1 to 12 carbon atoms, where a methylene group in the alkylene group may be substituted with an oxygen atom, —COO—, —OCO—, or —OCOO— as long as oxygen atoms are not directly bonded to each other. To suppress a variation in pretilt angle, a single bond or an alkylene group having 1 to 4 carbon atoms is preferred. To increase the solubility, the alkylene group preferably contains a certain number of methylene groups, but an excessively large number of methylene groups increase the flexibility of a polymer to be obtained, which causes image sticking. Therefore, to increase the solubility, an alkylene group having 1 to 8 carbon atoms is preferred and an alkylene group having 1 to 5 carbon atoms is further preferred.

Herein, m preferably represents 0, 1, or 2 and more preferably 0 or 1; n preferably represents 1, 2, or 3 and more preferably 1 or 2; and m+n is preferably 1, 2, or 3 and more preferably 1 or 2.

$X^{11}$, $X^{12}$, $X^{13}$, $X^{14}$, $X^{15}$, and $X^{16}$ each independently represent a hydrogen atom, an alkyl group, an alkyl halide group, an alkoxy group, an alkoxy halide group, a halogen, a cyano group, or a nitro group; preferably each independently represent a hydrogen atom, an alkyl group having 1 to 4 carbon atoms, an alkyl halide group having 1 to 4 carbon atoms, an alkoxy group having 1 to 4 carbon atoms, an alkoxy halide group having 1 to 4 carbon atoms, or a halogen; preferably each independently represent a hydrogen atom, a methyl group, an ethyl group, a propyl group, a methoxy group, an ethoxy group, a propoxy group, a trifluoromethyl group, a 2,2,2-trifluoroethyl group, a trifluoromethoxy group, a pentafluoromethoxy group, a fluorine atom, or a chlorine atom; preferably each independently represent a hydrogen atom, a methyl group, an ethyl group, a methoxy group, an ethoxy group, a trifluoromethyl group, a trifluoromethoxy group, a fluorine atom, or a chlorine atom; or preferably each independently represent a hydrogen atom, a trifluoromethyl group, a trifluoromethoxy group, or a fluorine atom. When a substituent other than a hydrogen atom is employed, $X^{13}$ or $X^{14}$ is preferably substituted.

$L^{11}$, $L^{12}$, and $L^{14}$ preferably each independently represent a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —CO—NR$^{111}$—, —NR$^{111}$—CO—, —SCH$_2$—, —CH$_2$S—, —CH=CH—COO—, —COO—CH=CH—, —OCO—CH=CH—, —COOC$_2$H$_4$—, —COOC$_2$H$_4$—, —C$_2$H$_4$OCO—, —C$_2$H$_4$COO—, —OCOCH$_2$—, —CH$_2$COO—, —CH=CH—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— (where R$^{111}$ represents an alkyl group having 1 to 4 carbon atoms); more preferably a single bond —O—, —OCH$_2$—, —CH$_2$O—, —CO—, —C$_2$H$_4$—, —COO—, —OCO—, —OCOOCH$_2$—, —CH$_2$OCOO—, —CH=CH—COO—, —COO—CH=CH—, —OCO—CH=CH—OCO—, —COOC$_2$H$_4$—, —OCOC$_2$H$_4$—, C$_2$H$_4$OCO—, —C$_2$H$_4$COO—, —OCOCH$_2$—, —CH$_2$COO—, or —CH=CH—; and further preferably a single bond, —O—, —OCH$_2$—, —CH$_2$O—, —CH=CH—

OCO—, —COO—CH=CH—, —OCO—CH=CH—OCO—, —COOC$_2$H$_4$—, —OCOC$_2$H$_4$—, —C$_2$H$_4$OCO—, —C$_2$H$_4$COO—, —OCOCH$_2$—, —CH$_2$COO—, or —CH=CH—. When a plurality of L$^{12}$s are present, L$^{12}$s may be the same as or different from each other. When a plurality of L$^{14}$s are present, L$^{14}$s may be the same as or different from each other.

Z$^{11}$ preferably represents H, F, Cl, CN, SCN, OCF$_3$, an alkyl group having 1 to 12 carbon atoms, where a methylene group in the alkyl group may be substituted with an oxygen atom, a sulfur atom, —CO—, —COO—, —OCO—, —OCOO—, —CH=CH—, or —C≡C— as long as oxygen atoms are not directly bonded to each other, or —S$^{12}$—R$^{12}$; more preferably H, F, an alkyl group having 1 to 12 carbon atoms, where a methylene group in the alkyl group may be substituted with an oxygen atom, a sulfur atom, —CO—, —COO—, —OCO—, —OCOO—, —CH=CH—, or —C≡C— as long as oxygen atoms are not directly bonded to each other, or —S$^{12}$—R$^{12}$; or further preferably a hydrogen atom, an alkyl group having 1 to 12 carbon atoms, where a methylene group in the alkyl group may be substituted with an oxygen atom as long as oxygen atoms are not directly bonded to each other, or —S$^{12}$—R$^{12}$. R$^{12}$ has the same meaning as R$^{11}$, and S$^{12}$ independently has the same meaning as S$^{11}$. When Z$^{11}$ represents —S$^{12}$—R$^{12}$, S$^{11}$ and S$^{12}$ each independently represent a spacer group or a single bond as described above. The spacer group is preferably a single bond or an alkylene group having 2 to 12 carbon atoms and more preferably a single bond or an alkylene group having 2 to 12 carbon atoms where a methylene group in the alkylene group may be substituted with an oxygen atom, —COO—, —OCO—, or —OCOO— as long as oxygen atoms are not directly bonded to each other.

M$^{11}$ and M$^{12}$ each independently represent a 1,4-phenylene group, a 1,4-cyclohexylene group, a pyridine-2,5-diyl group, a pyrimidine-2,5-diyl group, a piperidine-2,5-diyl group, a naphthalene-2,6-diyl group, an indane-2,5-diyl group, a tetrahydronaphthalene-2,6-diyl group, or a 1,3-dioxane-2,5-diyl group, where hydrogen atoms in M$^{11}$ and M$^{12}$ may be each independently unsubstituted or substituted with a fluorine atom, a chlorine atom, a cyano group, an alkyl group having 1 to 8 carbon atoms, an alkyl halide group, an alkoxy halide group, an alkoxy group, or a nitro group. When a plurality of M$^{11}$s are present, M$^{11}$s may be the same as or different from each other. When a plurality of M$^{12}$s are present, M$^{12}$s may be the same as or different from each other. M$^{11}$ and M$^{12}$ preferably each independently represent a 1,4-phenylene group or a 1,4-cyclohexylene group, where hydrogen atoms in M$^{11}$ and M$^{12}$ may be each independently unsubstituted or substituted with a fluorine atom. When a plurality of M$^{11}$s are present, M$^{11}$s may be the same as or different from each other. When a plurality of M$^{12}$s are present, M$^{12}$s may be the same as or different from each other.

L$^{13}$ represents —CH=CH—COO—, —CH=CH—OCO—, —COO—CH=CH—, —OCO—CH=CH—, —CH=C(CH$_3$)—COO—, —CH=C(CH$_3$)—OCO—, —COO—C(CH$_3$)=CH—, or —OCO—C(CH$_3$)=CH—. To increase the reactivity with UV, L$^{13$} preferably represents —CH=CH—COO—, —CH=CH—OCO—, —CH=C(CH$_3$)—COO—, or —CH=C(CH$_3$)—OCO— that is conjugated with a naphthalene ring. A polymerizable compound having L$^{13}$ as a linkage group such as —CH=CQ-COO—, —CH=CQ-OCO—, —COO—CQ=CH—, or —OCO-CQ=CH— (where Q represents a hydrogen atom or a methyl group) has high compatibility with a liquid crystal material. To achieve higher compatibility, Q preferably represents a methyl group. To achieve higher productivity, Q preferably represents a hydrogen atom.

More specifically, the compound represented by the general formula (I) is preferably selected from compounds represented by general formulae (I-1) to (I-67) below.

[Chem. 7]

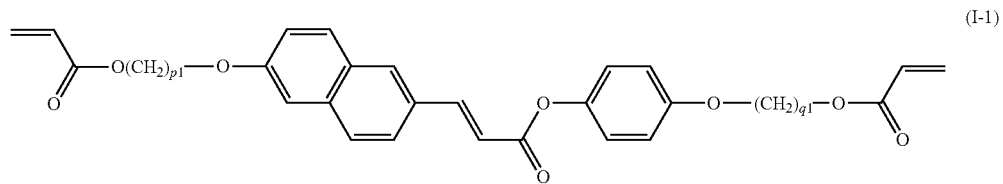

(I-1)

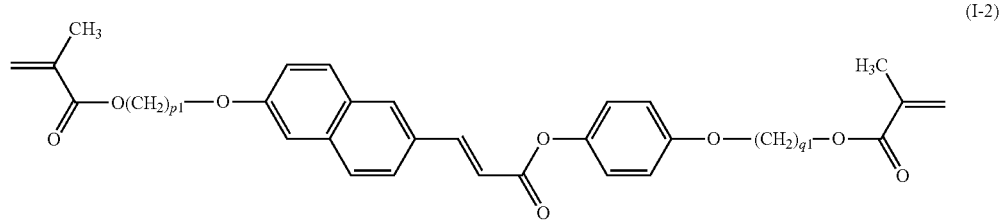

(I-2)

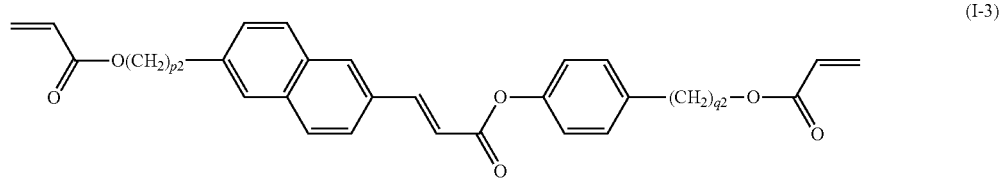

(I-3)

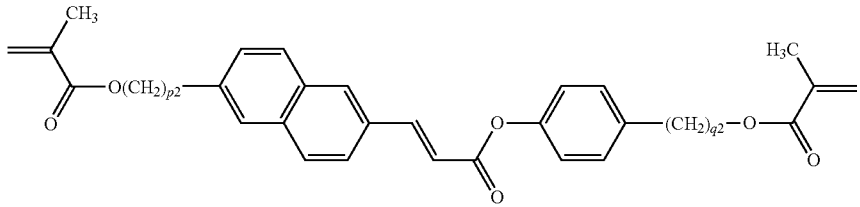
(I-4)
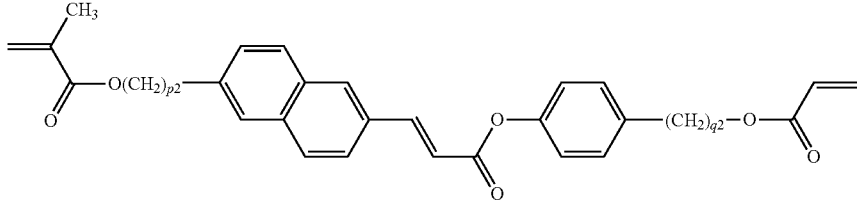
(I-5)
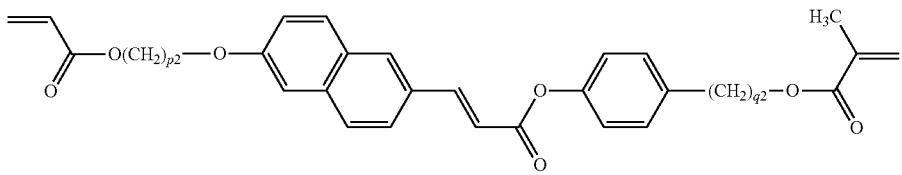
(I-6)
[Chem. 8]
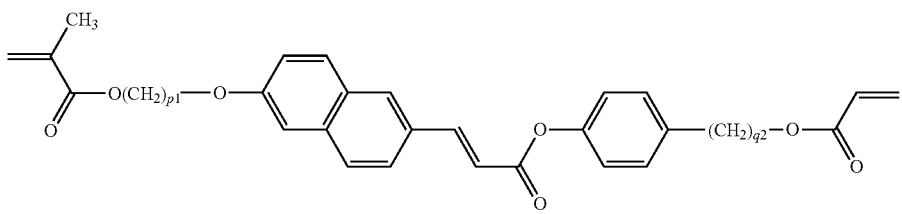
(I-7)
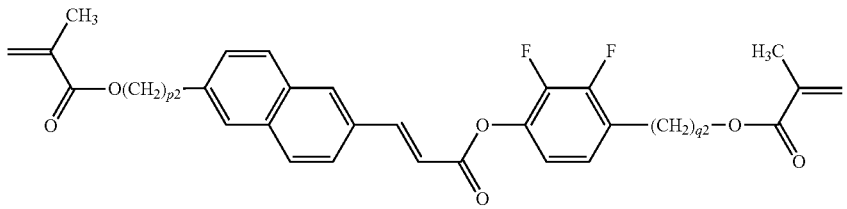
(I-8)
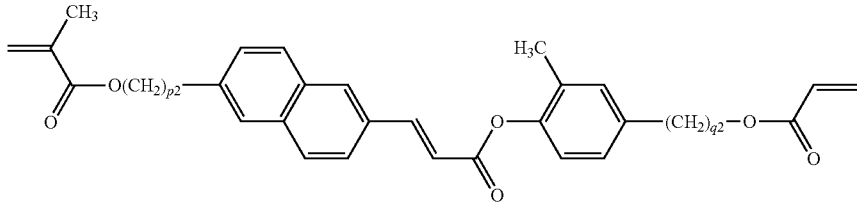
(I-9)
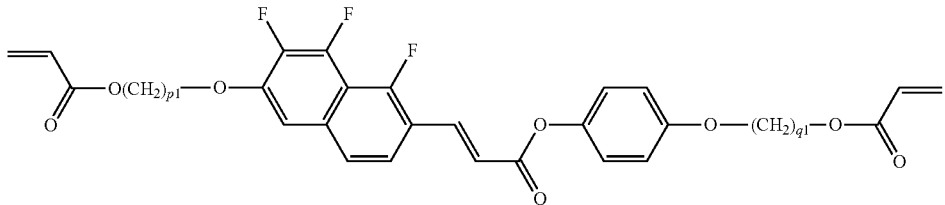
(I-10)

-continued
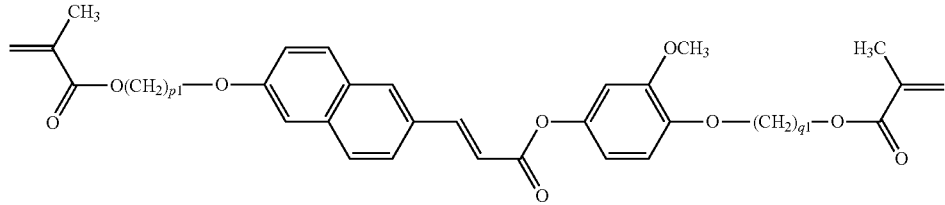
(I-11)
[Chem. 9]
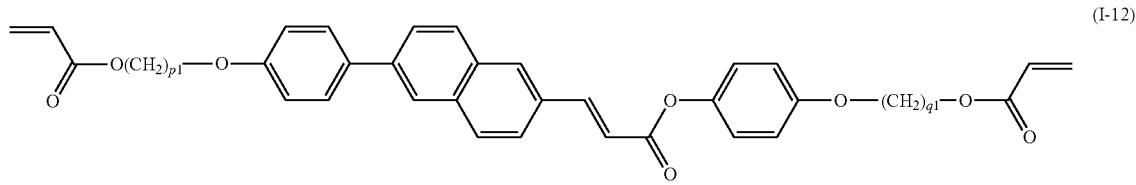
(I-12)
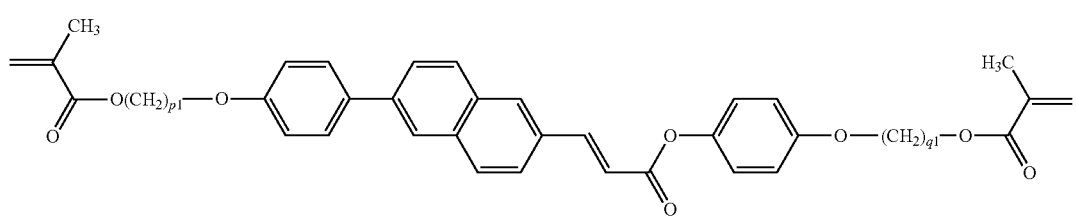
(I-13)
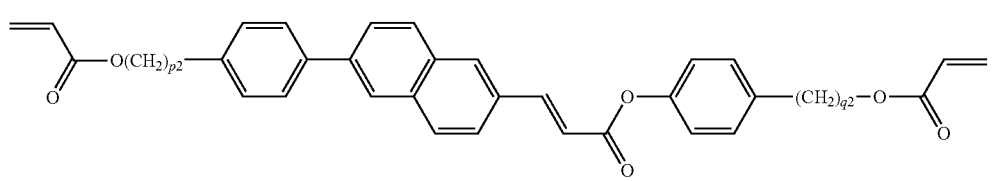
(I-14)
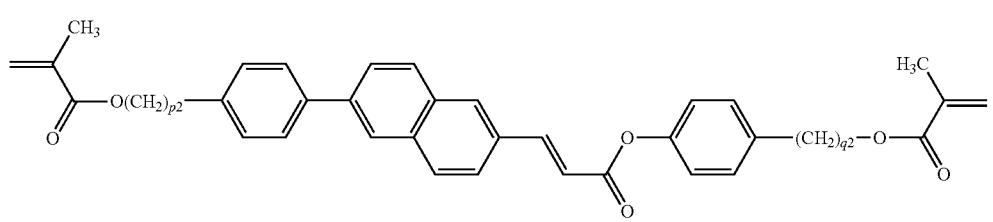
(I-15)
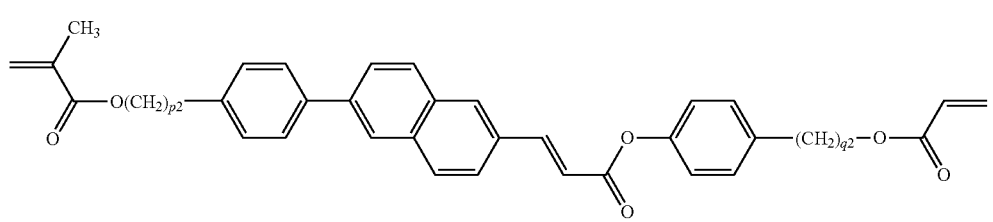
(I-16)
[Chem. 10]
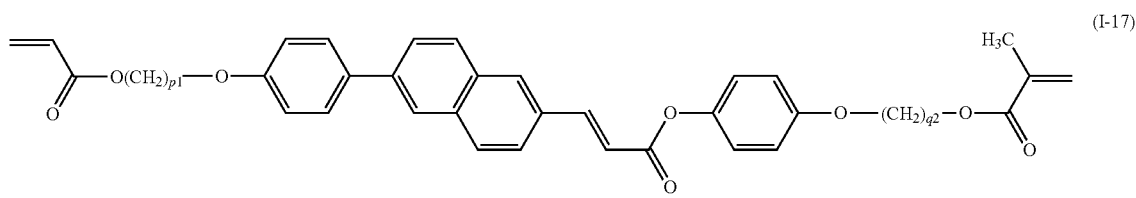
(I-17)

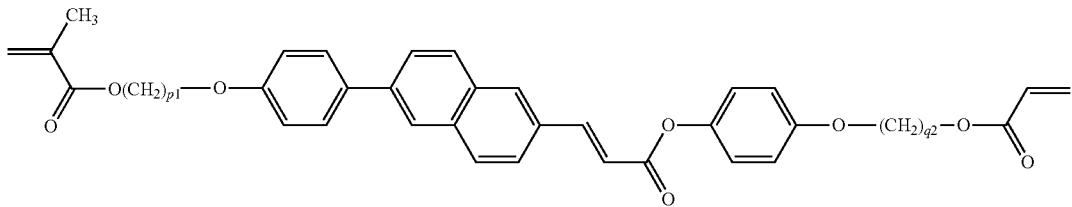
(I-18)
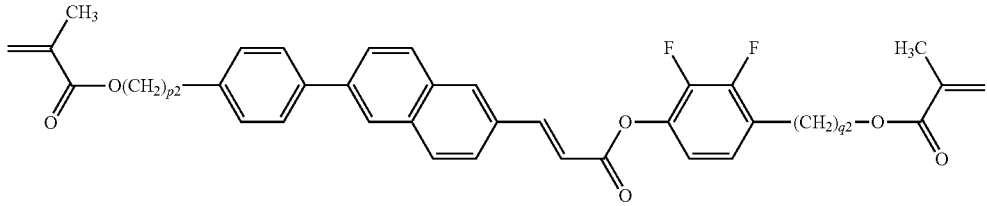
(I-19)
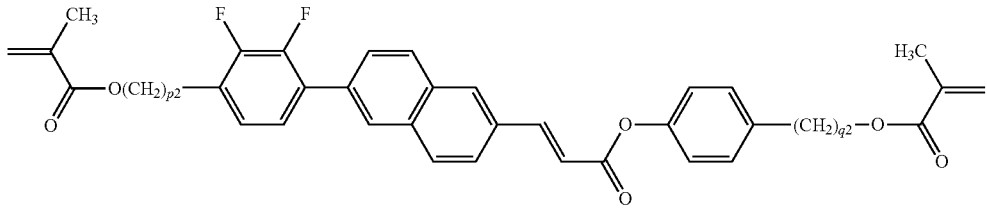
(I-20)
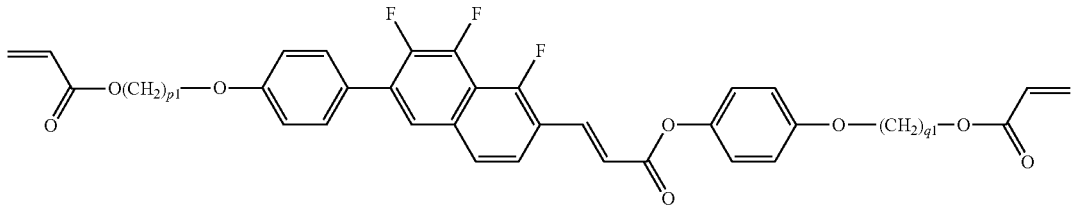
(I-21)
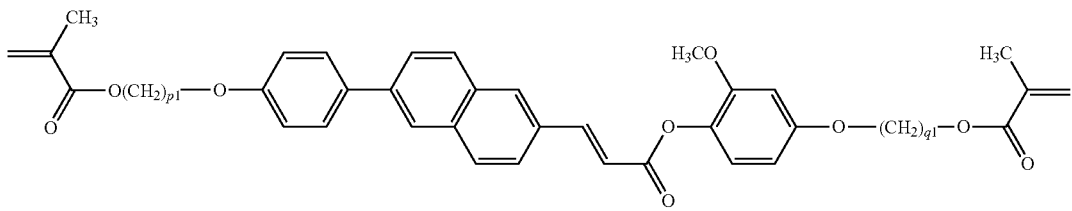
(I-22)
[Chem. 11]
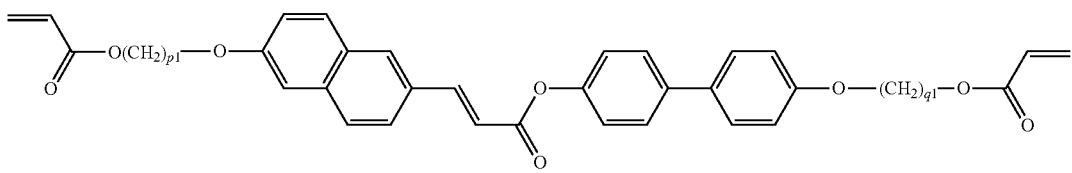
(I-22)
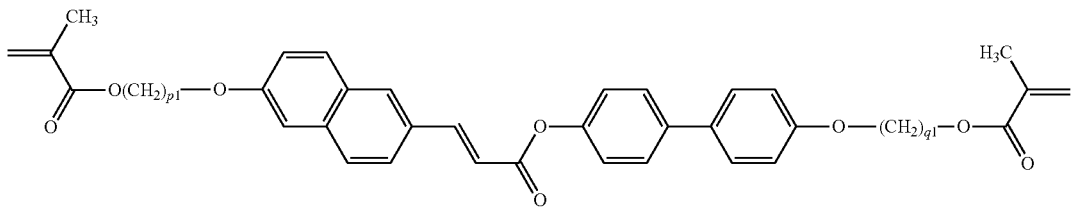
(I-23)

-continued
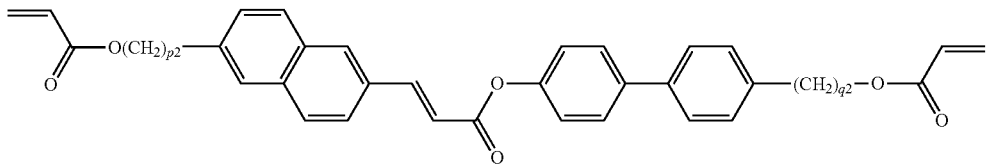
(I-24)
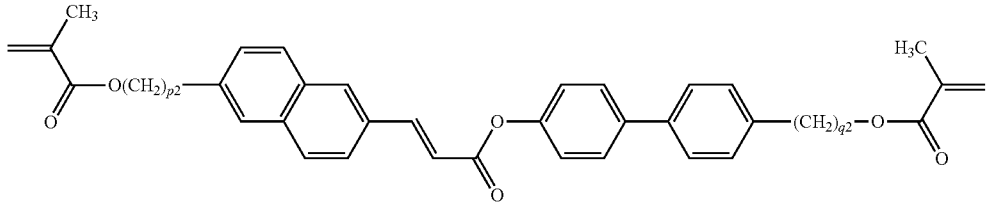
(I-25)
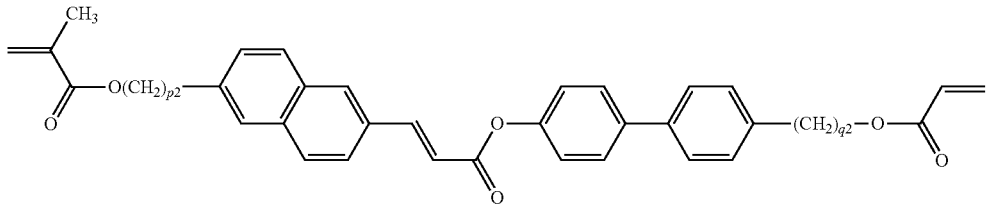
(I-26)
[Chem. 12]
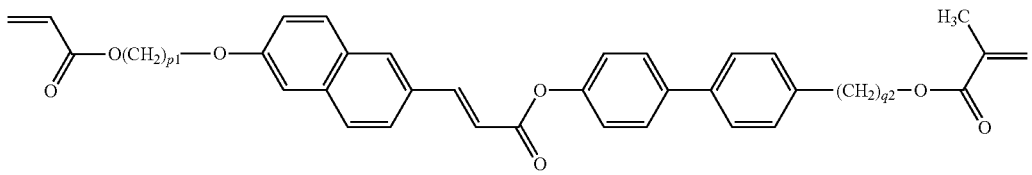
(I-27)
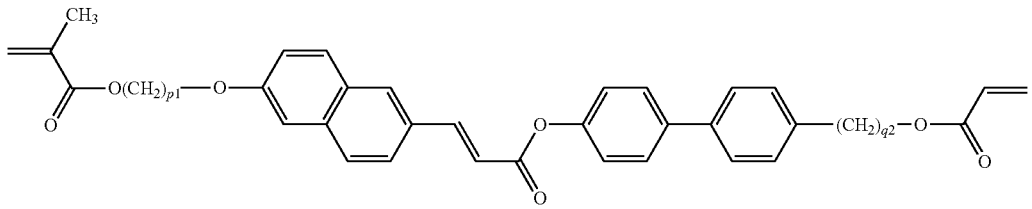
(I-28)
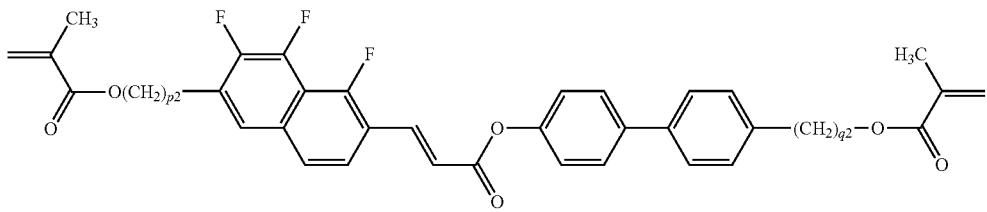
(I-29)
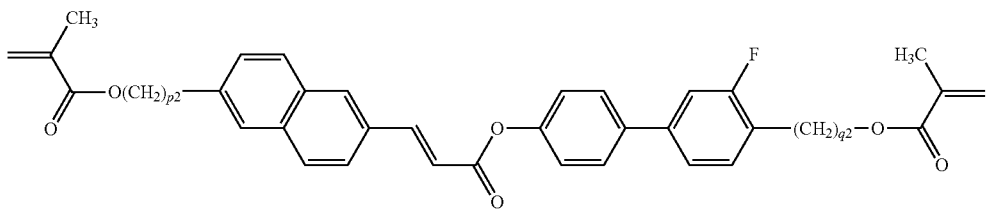
(I-30)

-continued
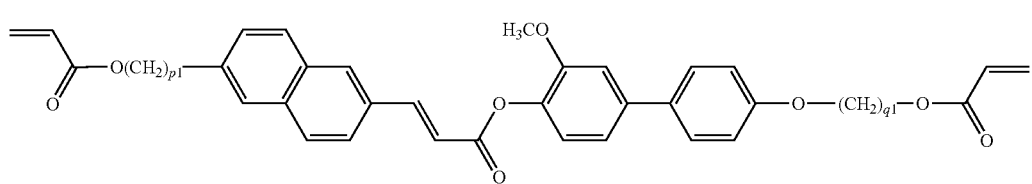
(I-31)
[Chem. 13]
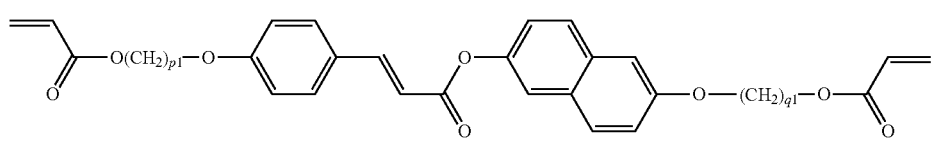
(I-32)
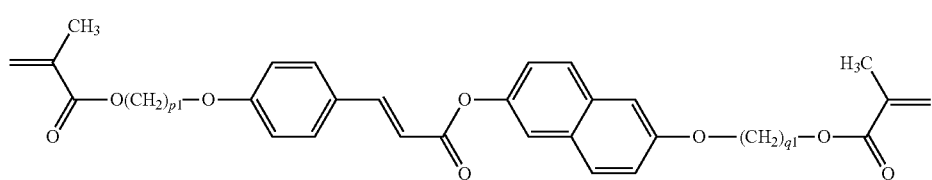
(I-33)
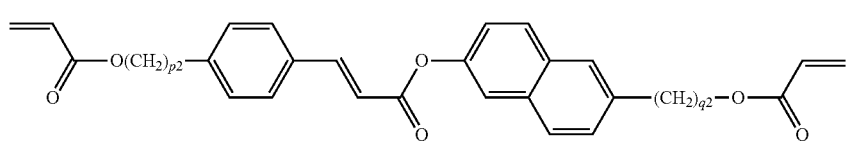
(I-34)
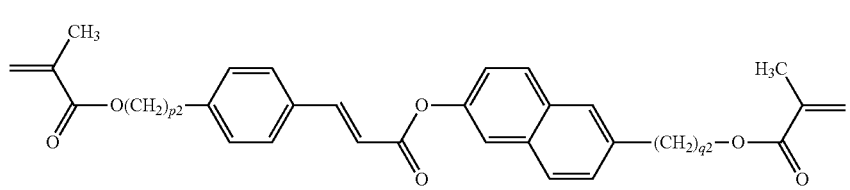
(I-35)
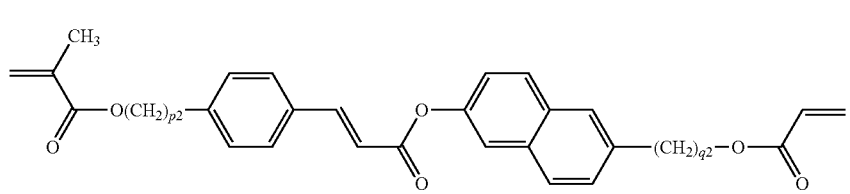
(I-36)
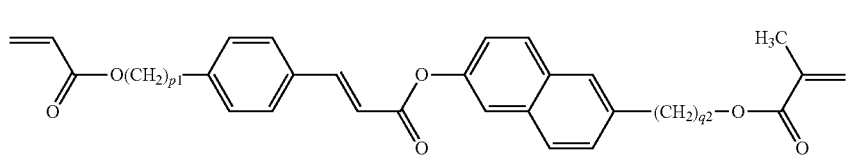
(I-37)
[Chem. 14]
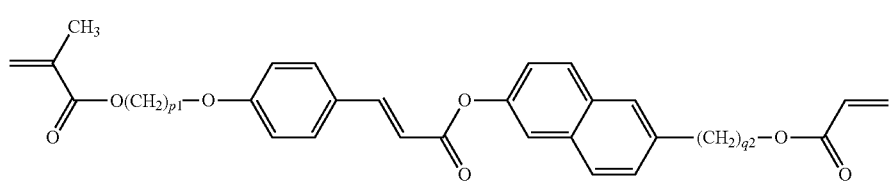
(I-38)
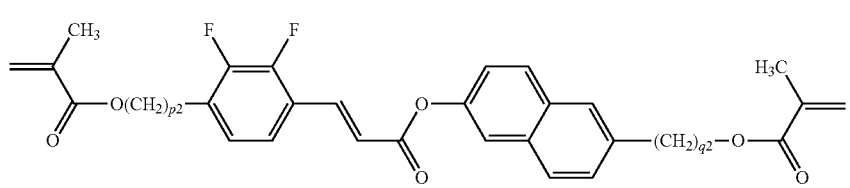
(I-39)

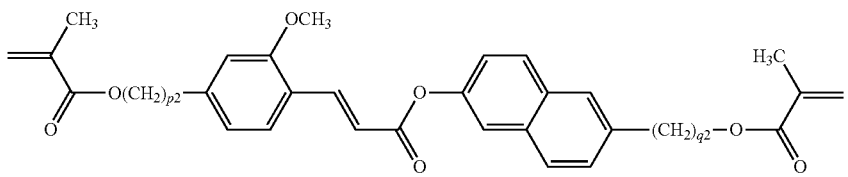
(I-40)
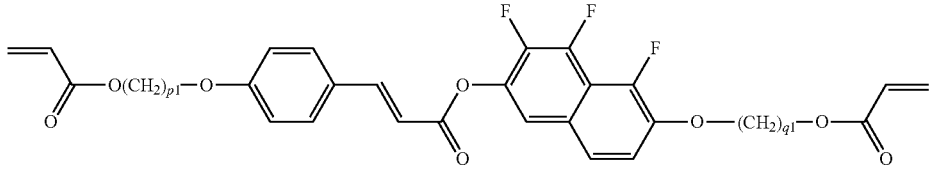
(I-41)
[Chem. 15]
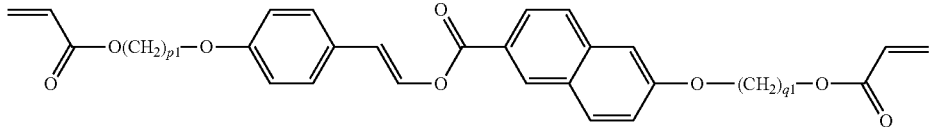
(I-42)
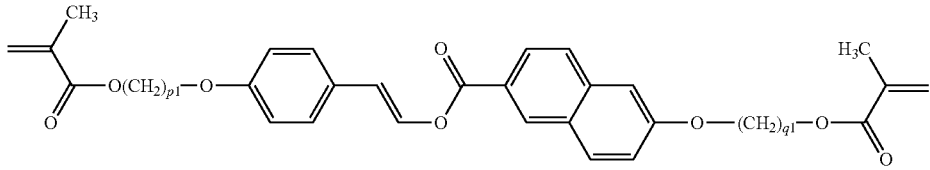
(I-43)
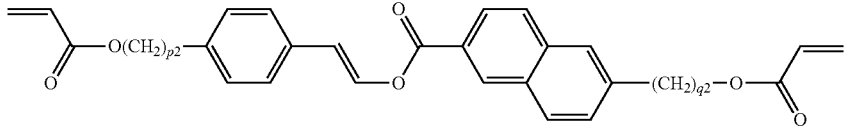
(I-44)
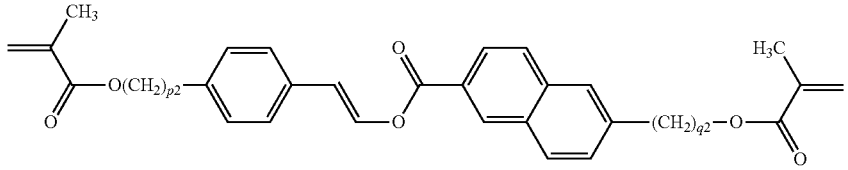
(I-45)
[Chem. 16]
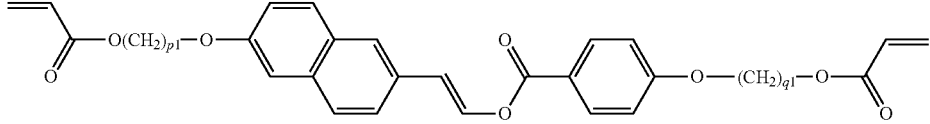
(I-46)
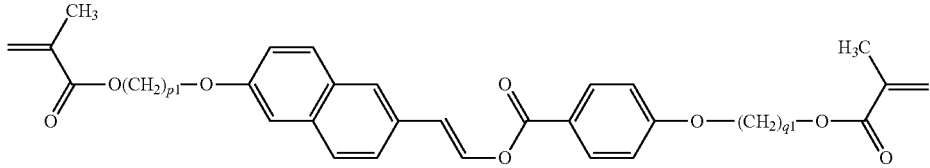
(I-47)
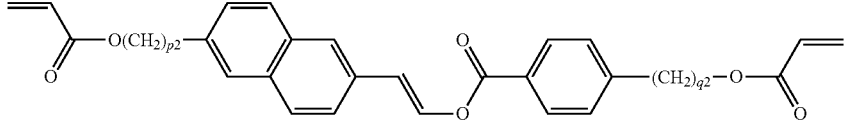
(I-48)

(I-49)
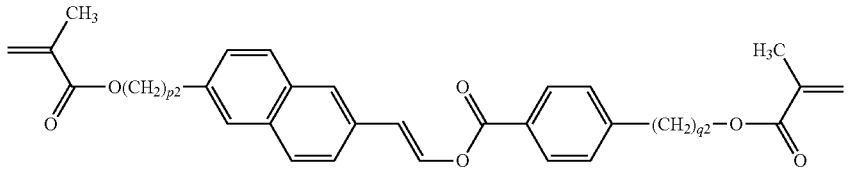
[Chem. 17]
(I-50)
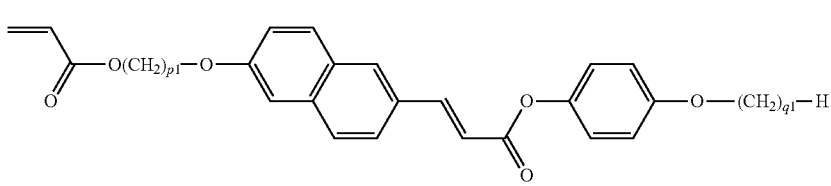
(I-51)
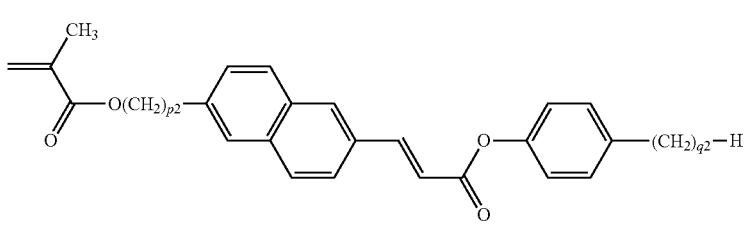
[Chem. 18]
(I-52)
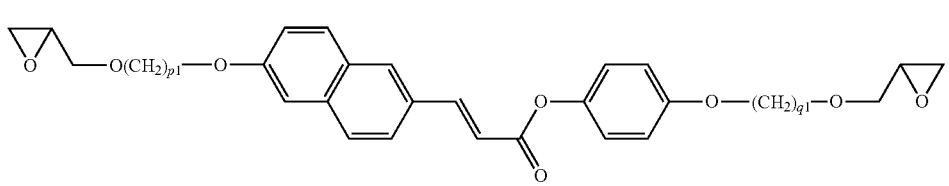
(I-53)
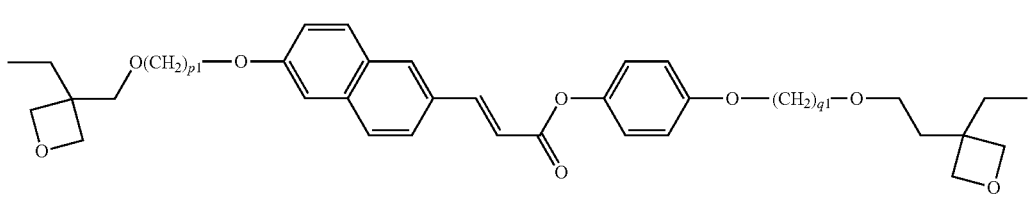
(I-54)
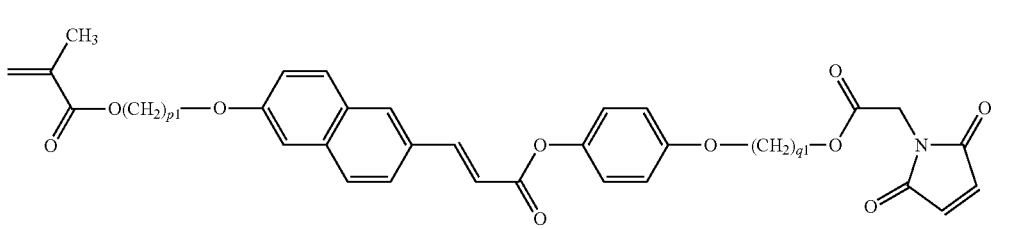
[Chem. 19]
(I-55)
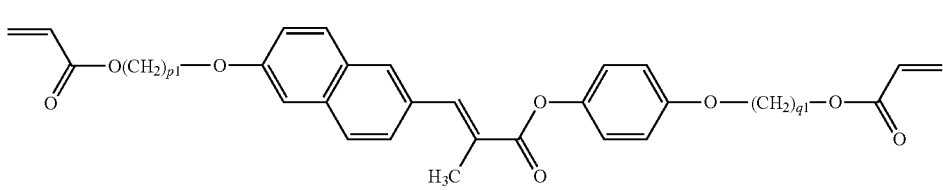

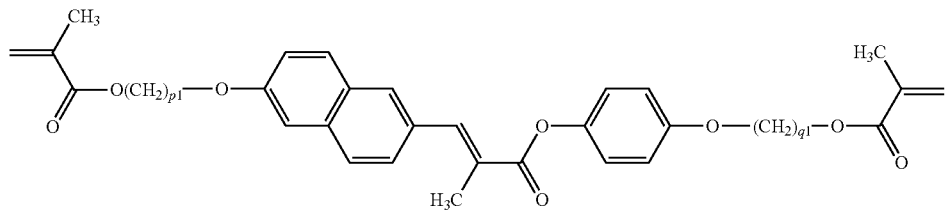
(I-56)
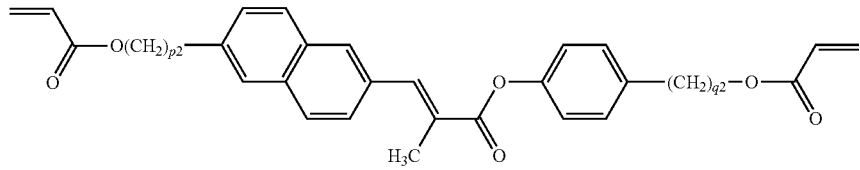
(I-57)
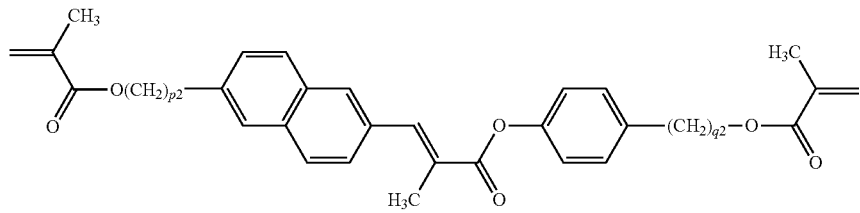
(I-58)
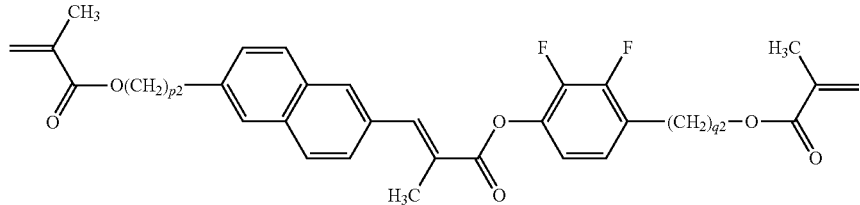
(I-59)
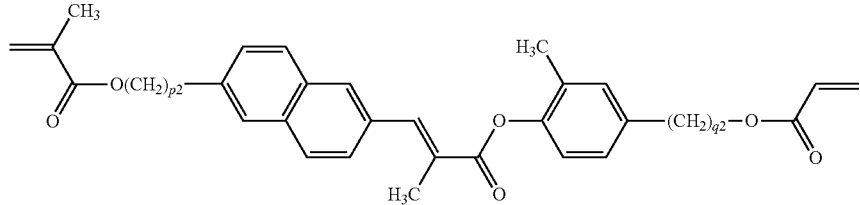
(I-60)
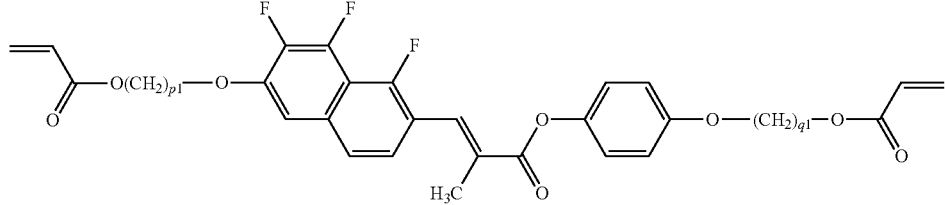
(I-61)
[Chem. 20]
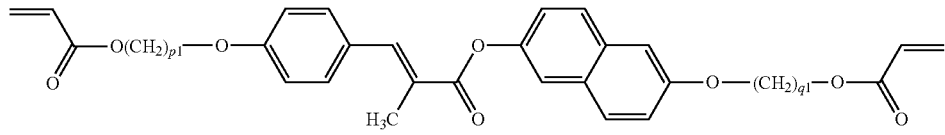
(I-62)

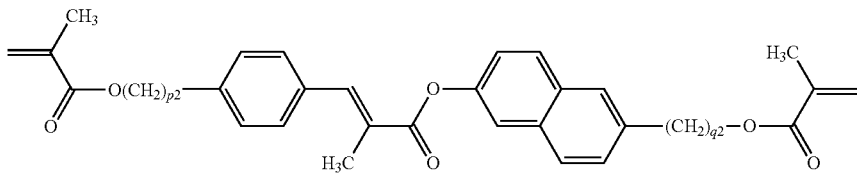

(I-63)

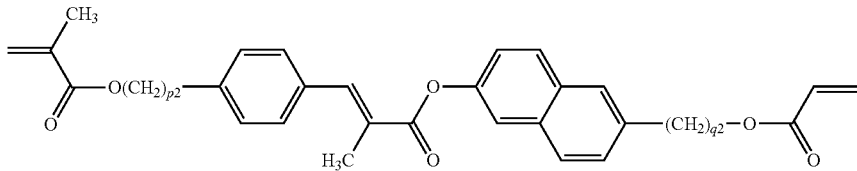

(I-64)

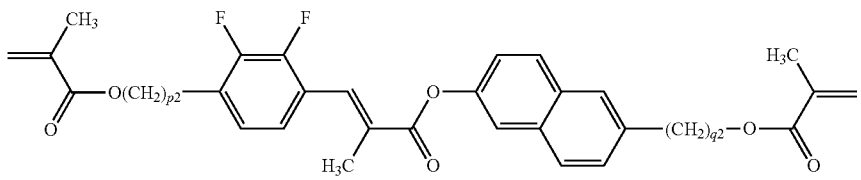

(I-65)

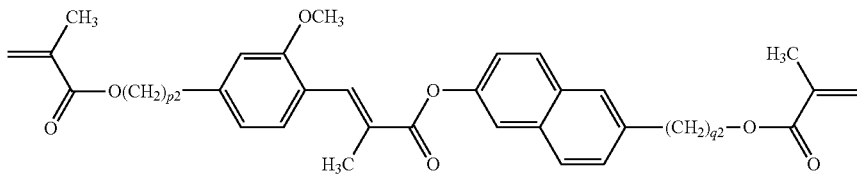

(I-66)

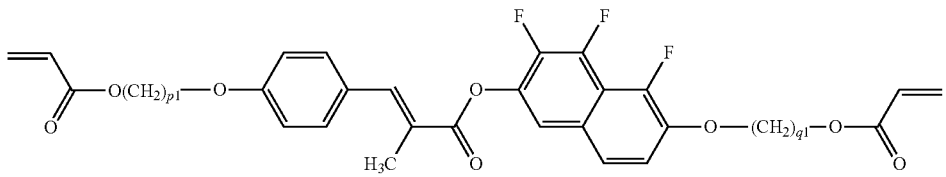

(I-67)

(In the formulae, p1 and q1 each independently represent an integer of 1 to 12 and p2 and q2 each independently represent an integer of 0 to 12.)

The compounds represented by the general formulae (I-1) to (I-11), the general formulae (I-32) to (I-49), and the general formulae (I-54) to (I-58) are more preferably used. The compounds represented by the general formulae (I-1) to (I-11) are further preferably used.

The liquid crystal composition containing a polymerizable compound according to the present invention contains at least one of the polymerizable compounds represented by the general formula (I), preferably 1 to 5 of the polymerizable compounds, and particularly preferably 1 to 3 of the polymerizable compounds. If the content of the compound represented by the general formula (I) is excessively low, the alignment controlling force exerted on non-polymerizable liquid crystal compounds is weakened. If the content is excessively high, the energy required during polymerization is increased and thus the amount of polymerizable compound left without being polymerized is increased. Therefore, the lower limit of the content is preferably 0.01% by mass and more preferably 0.03% by mass. The upper limit of the content is preferably 2.0% by mass and more preferably 1.0% by mass.

In the compound represented by the general formula (II) and used as a second component, $R^{21}$ and $R^{22}$ preferably each independently represent an alkyl group having 1 to 10 carbon atoms or an alkenyl group having 2 to 10 carbon atoms (one methylene group or two or more methylene groups that are not adjacent to each other in these groups may be substituted with —O— or —S—, and at least one hydrogen atom in these groups may be substituted with a fluorine atom or a chlorine atom); more preferably an alkyl group having 1 to 5 carbon atoms, an alkoxy group having 1 to 5 carbon atoms, an alkenyl group having 2 to 5 carbon atoms, or an alkenyloxy group having 3 to 6 carbon atoms; and particularly preferably an alkyl group having 1 to 5 carbon atoms or an alkoxy group having 1 to 5 carbon atoms.

$M^{21}$, $M^{22}$, and $M^{23}$ preferably each independently represent a trans-1,4-cyclohexylene group (a $CH_2$ group or two $CH_2$ groups that are not adjacent to each other in this group may be substituted with an oxygen atom), a 1,4-phenylene group (at least one CH group in this group may be substituted with a nitrogen atom), a 3-fluoro-1,4-phenylene group, a 3,5-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group; more preferably a trans-1,4-cyclohexylene group, a 1,4-phenylene group, or a 1,4-bicyclo[2.2.2]octylene group; and particularly preferably a trans-1,4-cyclohexylene group or a 1,4-phenylene group. Herein, o preferably represents 0, 1, or 2 and more preferably 0 or 1. $L^{21}$ and $L^{22}$ preferably each independently represent a single bond, —$CH_2CH_2$—, —$(CH_2)_4$—, —$OCH_2$—, —$CH_2O$—, —OCF$_2$—, —CF$_2$O—, —CH=CH—, —CH=N—N=CH—, or —C≡C—; more preferably a single bond, —CH$_2$CH$_2$—, —(CH$_2$)$_4$—, —OCH$_2$—, or —CH$_2$O—; and further preferably a single bond or —CH$_2$CH$_2$—. More specifically, the compound represented by the general formula (II) is preferably a compound selected from the group of compounds represented by general formulae (II-A) to (II-P) below.

[Chem. 21]

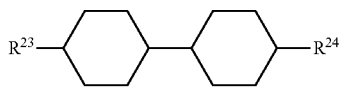
(II-A)

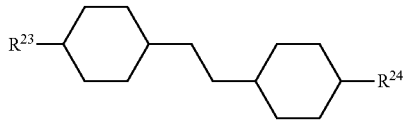
(II-B)

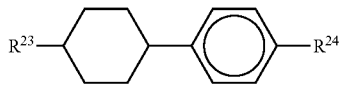
(II-C)

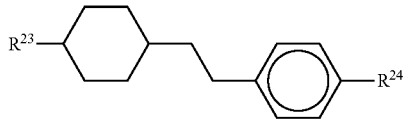
(II-D)

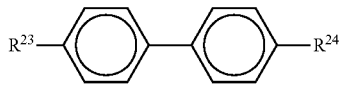
(II-E)

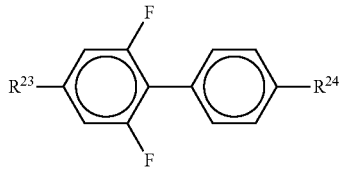
(II-F)

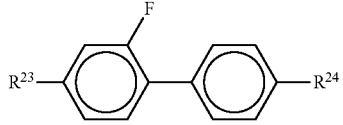
(II-G)

(II-H)

(II-I)

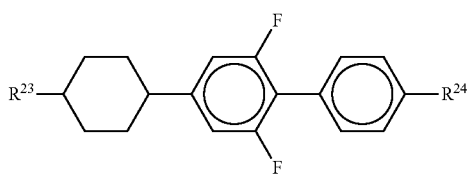
(II-J)

-continued

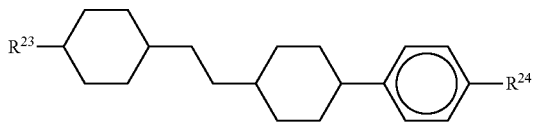
(II-K)

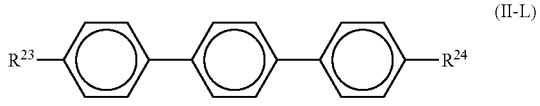
(II-L)

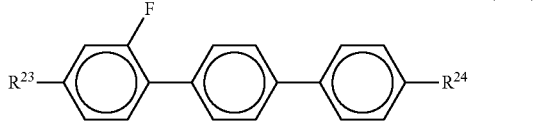
(II-M)

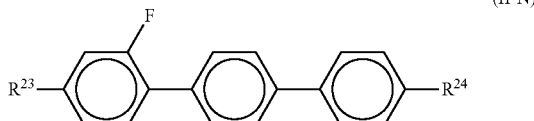
(II-N)

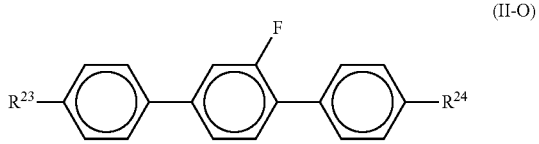
(II-O)

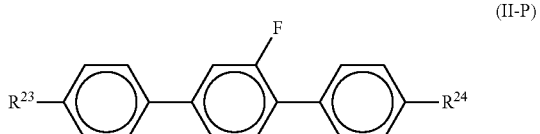
(II-P)

(In the formulae, R$^{23}$ and R$^{24}$ each independently represent an alkyl group having 1 to 10 carbon atoms, an alkoxy group having 1 to 10 carbon atoms, an alkenyl group having 2 to 10 carbon atoms, or an alkenyloxy group having 3 to 10 carbon atoms.)

R$^{23}$ and R$^{24}$ preferably each independently represent an alkyl group having 1 to 10 carbon atoms, an alkoxy group having 1 to 10 carbon atoms, or an alkenyl group having 2 to 10 carbon atoms and more preferably an alkyl group having 1 to 5 carbon atoms or an alkoxy group having 1 to 10 carbon atoms.

Among the compounds represented by the general formulae (II-A) to (II-P), the compounds represented by the general formulae (II-A), (II-B), (II-C), (II-E), (II-H), (II-I), (II-I), and (II-K) are preferred; and the compounds represented by the general formulae (II-A), (II-C), (II-E), (II-H), and (II-I) are further preferred.

In the present invention, one or more of the compounds represented by the general formula (II) is contained, 1 to 10 of the compounds are preferably contained, and 2 to 8 of the compounds are particularly preferably contained. The lower limit of the content of the compounds represented by the general formula (II) is preferably 5% by mass, more preferably 10% by mass, further preferably 20% by mass, and particularly preferably 30% by mass. The upper limit of the content is preferably 80% by mass, more preferably 70% by mass, and further preferably 60% by mass.

In the compounds represented by the general formulae (IIIa), (IIIb), and (IIIc) and used as third components, $R^{31}$, $R^{32}$, and $R^{33}$ preferably each independently represent an alkyl group having 1 to 10 carbon atoms or an alkenyl group having 2 to 10 carbon atoms, or a linear alkyl group having 1 to 15 carbon atoms or an alkenyl group having 2 to 15 carbon atoms (one methylene group or two or more methylene groups that are not adjacent to each other in these groups may be substituted with —O— or —S—, and at least one hydrogen atom in these groups may be substituted with a fluorine atom or a chlorine atom); more preferably a linear alkyl group having 1 to 10 carbon atoms, a linear alkoxy group having 1 to 10 carbon atoms, or an alkenyl group having 2 to 10 carbon atoms; and particularly preferably a linear alkyl group having 1 to 8 carbon atoms or an alkoxy group having 1 to 8 carbon atoms.

$M^{31}$, $M^{32}$, $M^{33}$, $M^{34}$, $M^{35}$, $M^{36}$, $M^{37}$, and $M^{38}$ preferably each independently represent a trans-1,4-cyclohexylene group (one methylene group or two or more methylene groups that are not adjacent to each other in this group may be substituted with —O— or —S—), a 1,4-phenylene group (one —CH= or two or more —CH= that are not adjacent to each other in this group may be substituted with a nitrogen atom), a 1,4-cyclohexenylene group, a 1,4-bicyclo(2.2.2)octylene group, a piperidine-1,4-diyl group, a naphthalene-2,6-diyl group, a 1,2,3,4-tetrahydronaphthalene-2,6-diyl group, or a decahydronaphthalene-2,6-diyl group (a hydrogen atom in these groups may be substituted with a cyano group, a fluorine atom, a trifluoromethyl group, a trifluoromethoxy group, or a chlorine atom); more preferably a trans-1,4-cyclohexylene group, a 1,4-phenylene group, a 3-fluoro-1,4-phenylene group, or a 3,5-difluoro-1,4-phenylene group; further preferably a trans-1,4-cyclohexylene group or a 1,4-phenylene group; and particularly preferably a trans-1,4-cyclohexylene group.

$L^{31}$, $L^{32}$, $L^{33}$, $L^{34}$, $L^{35}$, $L^{36}$, $L^{37}$, and $L^{38}$ preferably each independently represent a single bond, —OCO—, —COO—, —CH$_2$CH$_2$—, —(CH$_2$)$_4$—, —OCH$_2$—, —CH$_2$O—, —OCF$_2$—, —CF$_2$O—, or —C≡C—; more preferably a single bond, —CH$_2$CH$_2$—, —(CH$_2$)$_4$—, or —C≡C—; and particularly preferably a single bond or —CH$_2$CH$_2$—. $X^{31}$, $X^{32}$, $X^{33}$, $X^{34}$, $X^{35}$, $X^{36}$, and $X^{37}$ each independently represent a hydrogen atom or a fluorine atom. $Y^{31}$, $Y^{32}$, and $Y^{33}$ preferably each independently represent a fluorine atom, a chlorine atom, a cyano group, a thiocyanate group, a trifluoromethoxy group, a trifluoromethyl group, a 2,2,2-trifluoroethyl group, a difluoromethoxy group, or an alkyl group having 1 to 12 carbon atoms; more preferably a fluorine atom, a chlorine atom, a cyano group, a trifluoromethoxy group, a trifluoromethyl group, a 2,2,2-trifluoroethyl group, or an alkyl group having 1 to 12 carbon atoms; or particularly preferably a fluorine atom. Furthermore, p, q, r, s, and t each independently represent 0, 1, or 2, where q+r and s+t are each 2 or less.

Specifically, the compound represented by the general formula (IIIa) preferably has the following structure represented by general formula (IIIa-1).

[Chem. 22]

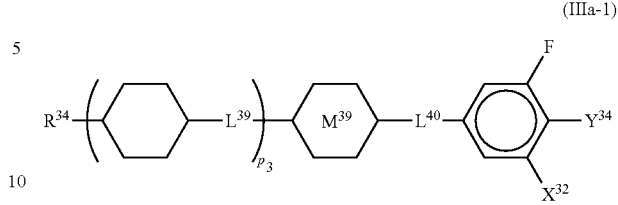

(IIIa-1)

(In the formula, $R^{34}$ represents an alkyl group having 1 to 8 carbon atoms, an alkoxyl group having 1 to 8 carbon atoms, or an alkenyl group having 2 to 8 carbon atoms; $L^{39}$ and $L^{40}$ each independently represent a single bond, —CH$_2$CH$_2$—, —(CH$_2$)$_4$—, —OCH$_2$—, —CH$_2$O—, —OCF$_2$—, —CF$_2$O—, or —C≡C—; $M^{39}$ represents a 1,4-phenylene group or a trans-1,4-cyclohexylene group; $X^{32}$ represents a hydrogen atom or a fluorine atom; $p_3$ represents 0 or 1; and $Y^{34}$ represents a cyano group, a fluorine atom, a chlorine atom, a trifluoromethyl group, a fluoromethoxy group, a difluoromethoxy group, or a trifluoromethoxy group.)

More specifically, the compound represented by the general formula (IIIa) preferably has the following structures represented by general formulae (IIIa-2a) to (IIIa-4-d).

[Chem. 23]

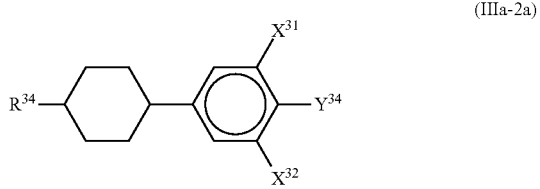

(IIIa-2a)

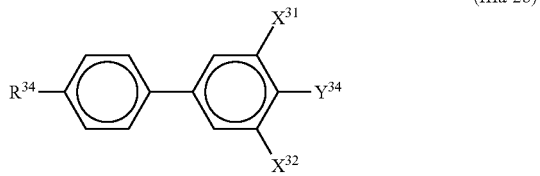

(IIIa-2b)

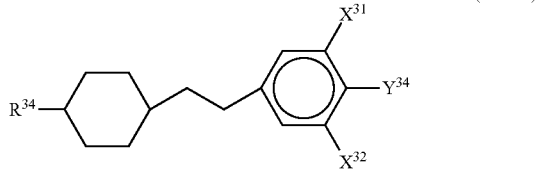

(IIIa-2c)

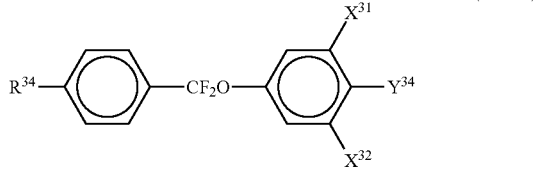

(IIIa-2d)

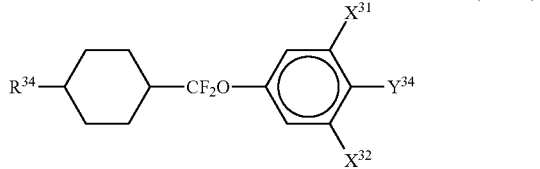

(IIIa-2e)

[Chem. 24]

(IIIa-3a)
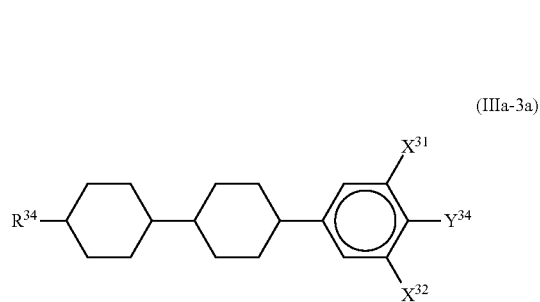

(IIIa-3b)

(IIIa-3c)
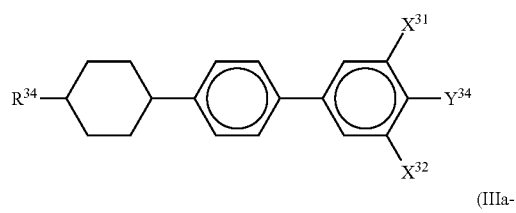

(IIIa-3d)
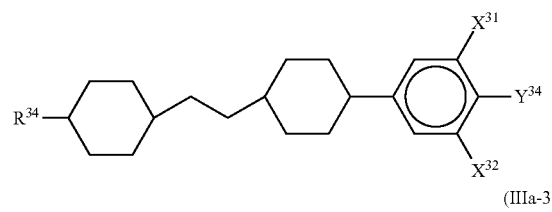

(IIIa-3e)
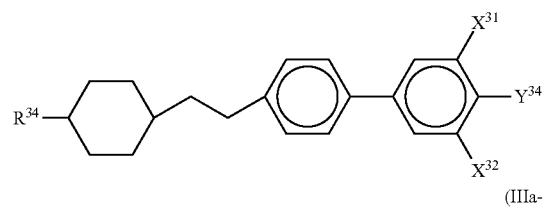

(IIIa-3f)
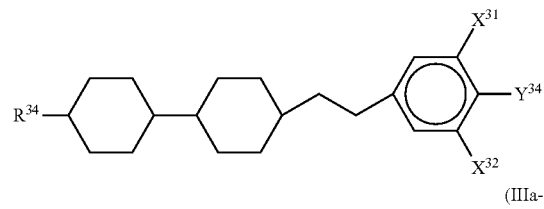

(IIIa-3g)
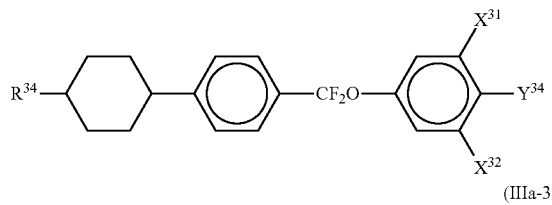

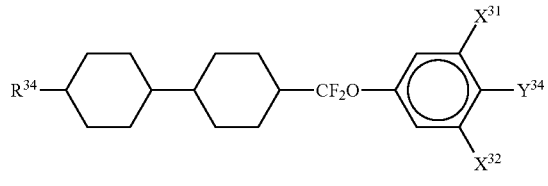

(IIIa-3h)
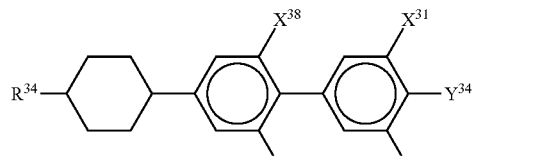

(IIIa-3i)
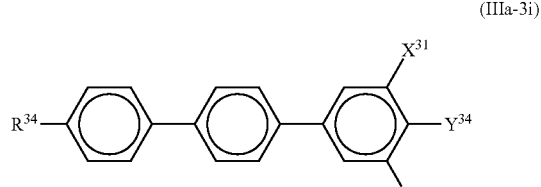

(IIIa-3j)
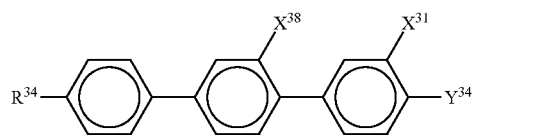

[Chem. 25]

(IIIa-4a)

(IIIa-4b)
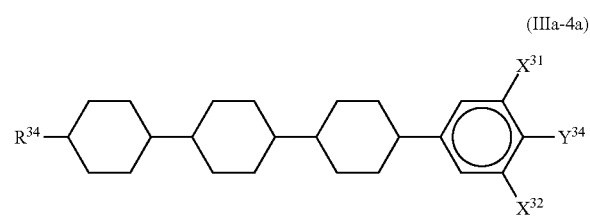

(IIIa-4c)

(IIIa-4d)
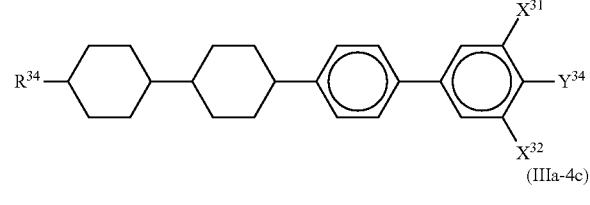

(In the formulae, $R^{34}$ represents an alkyl group having 1 to 8 carbon atoms, an alkoxyl group having 1 to 8 carbon atoms, or an alkenyl group having 2 to 8 carbon atoms; $X^{31}$ and $X^{32}$ each independently represent a hydrogen atom or a fluorine atom; and $Y^{34}$ represents a cyano group, a fluorine atom, a chlorine atom, a trifluoromethyl group, a fluoromethoxy group, a difluoromethoxy group, or a trifluoromethoxy group.)

The compound represented by the general formula (IIIa) also preferably has the following structures.

[Chem. 26]

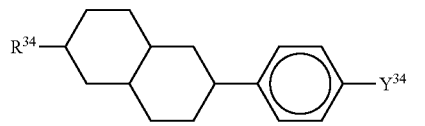

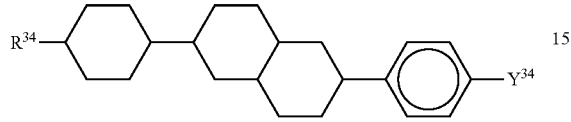

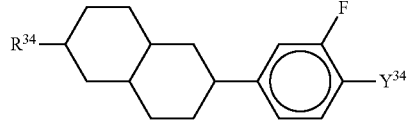

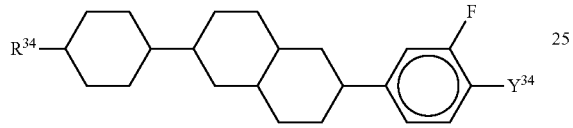

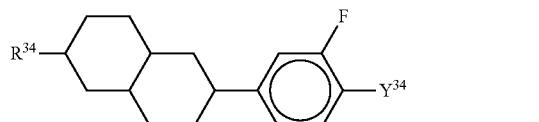

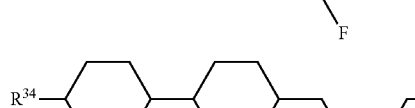

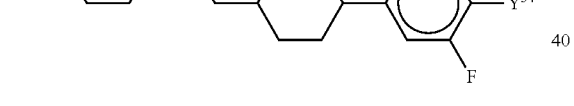

(In the formulae, $R^{34}$ represents an alkyl group having 1 to 8 carbon atoms, an alkoxyl group having 1 to 8 carbon atoms, or an alkenyl group having 2 to 8 carbon atoms; and $Y^{34}$ represents a cyano group, a fluorine atom, a chlorine atom, a trifluoromethyl group, a fluoromethoxy group, a difluoromethoxy group, or a trifluoromethoxy group.)

The compound represented by the general formula (IIIb) preferably has the following structures represented by general formulae below.

[Chem. 27]

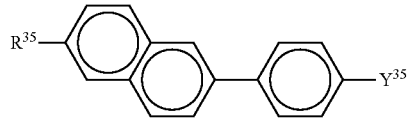

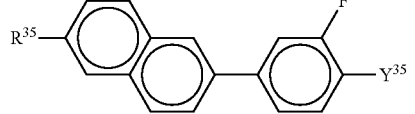

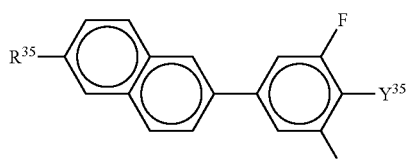

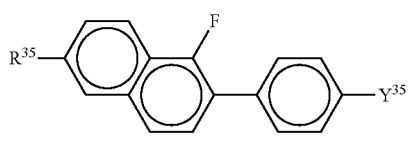

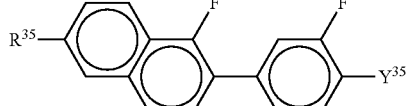

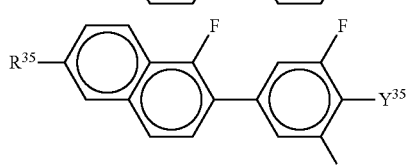

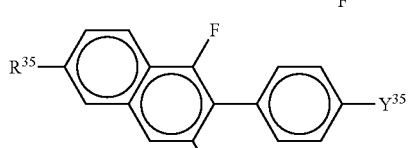

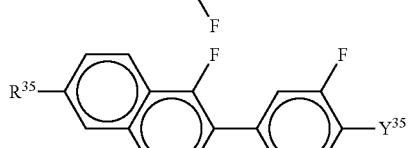

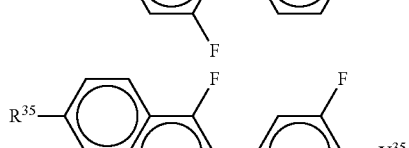

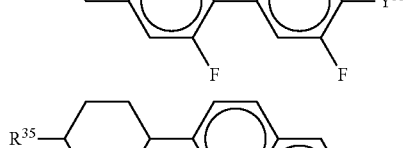

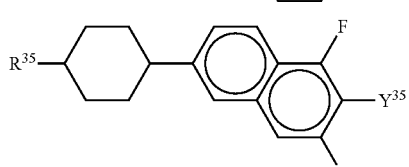

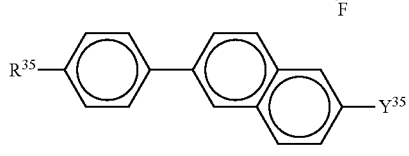

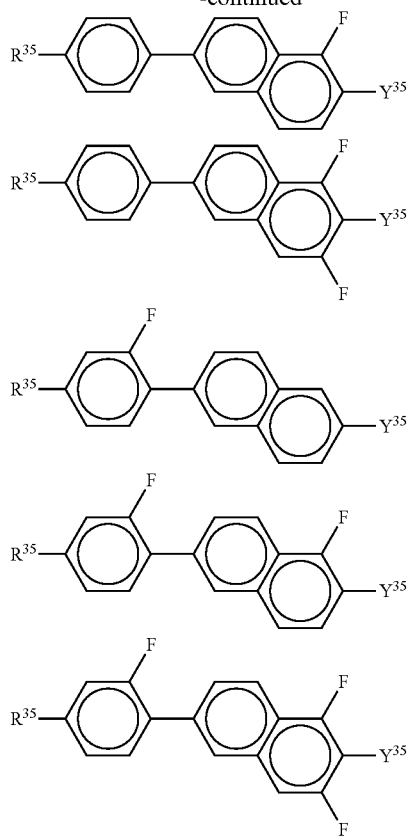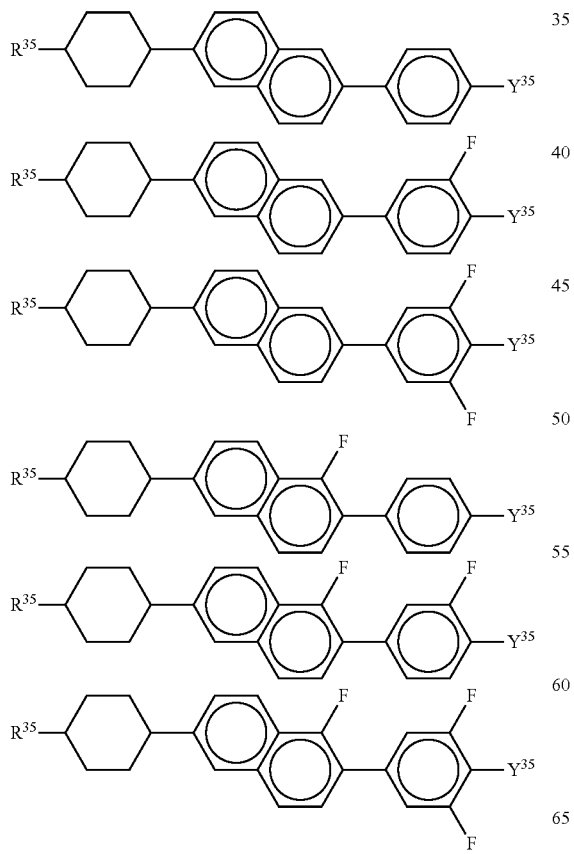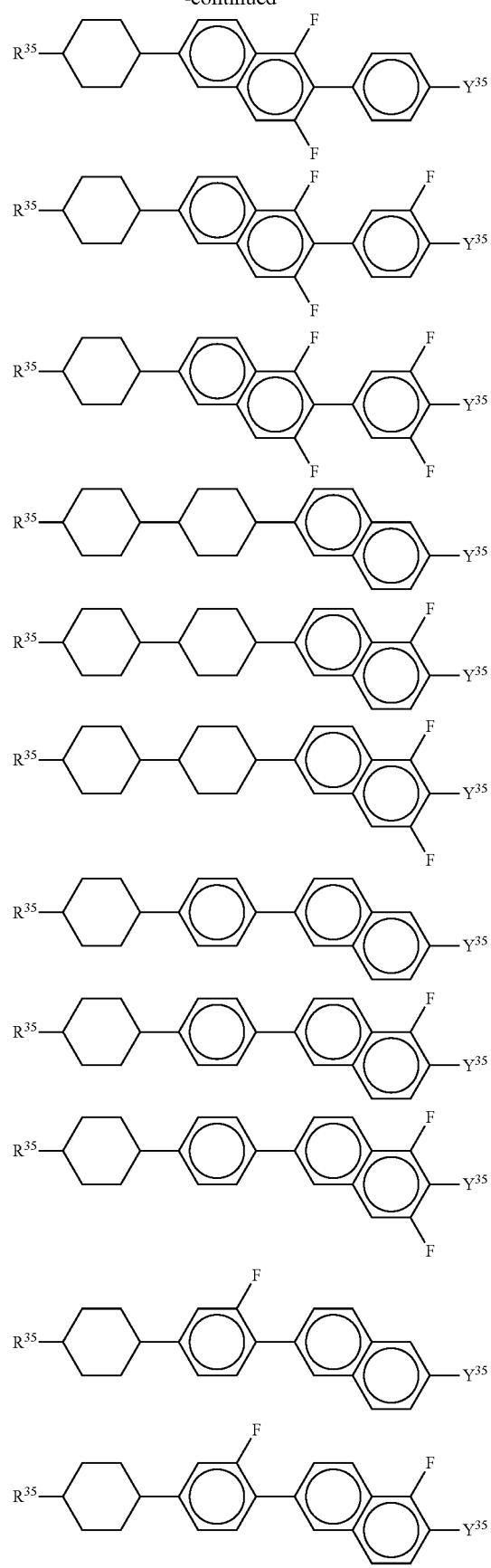

-continued

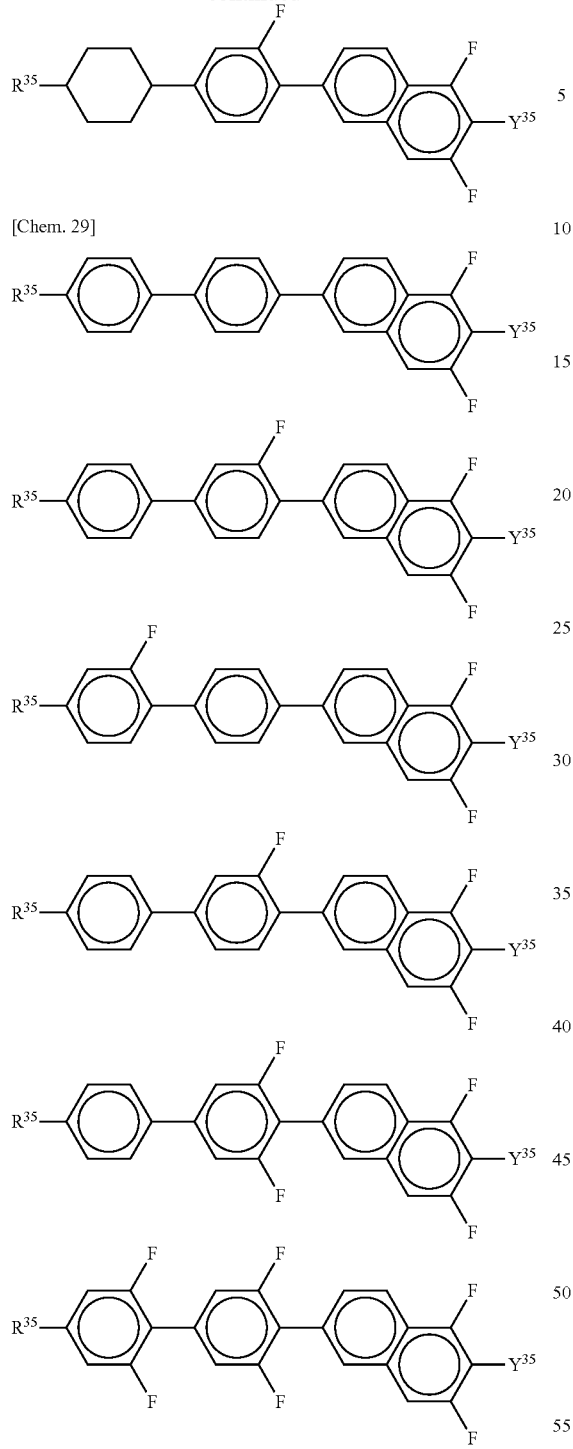

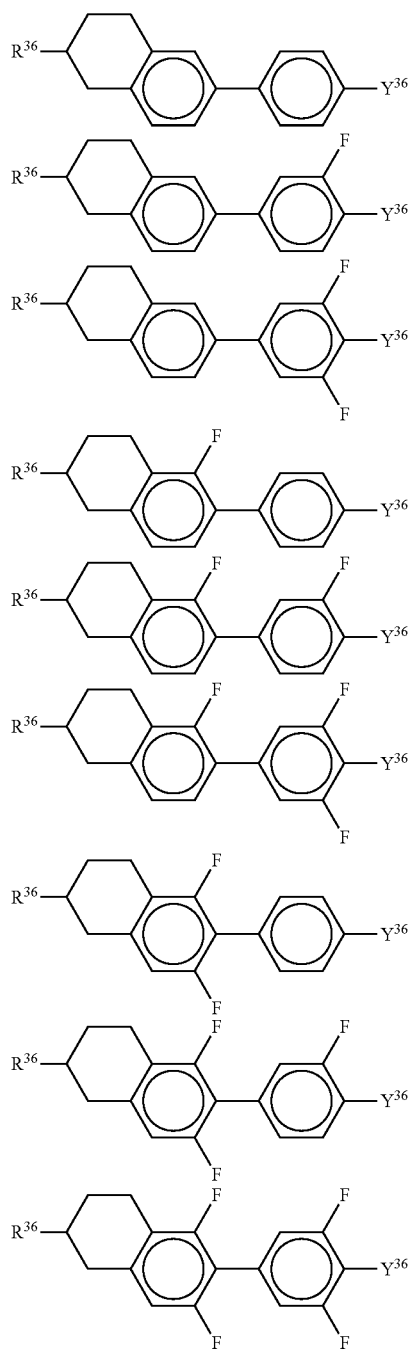

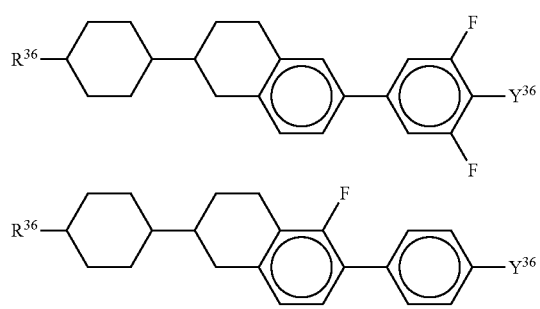

(In the formulae, $R^{35}$ represents an alkyl group having 1 to 8 carbon atoms, an alkoxyl group having 1 to 8 carbon atoms, or an alkenyl group having 2 to 8 carbon atoms; and $Y^{35}$ represents a cyano group, a fluorine atom, a chlorine atom, a trifluoromethyl group, a fluoromethoxy group, a difluoromethoxy group, or a trifluoromethoxy group.)

The compound represented by the general formula (IIIc) preferably has the following structures represented by general formulae below.

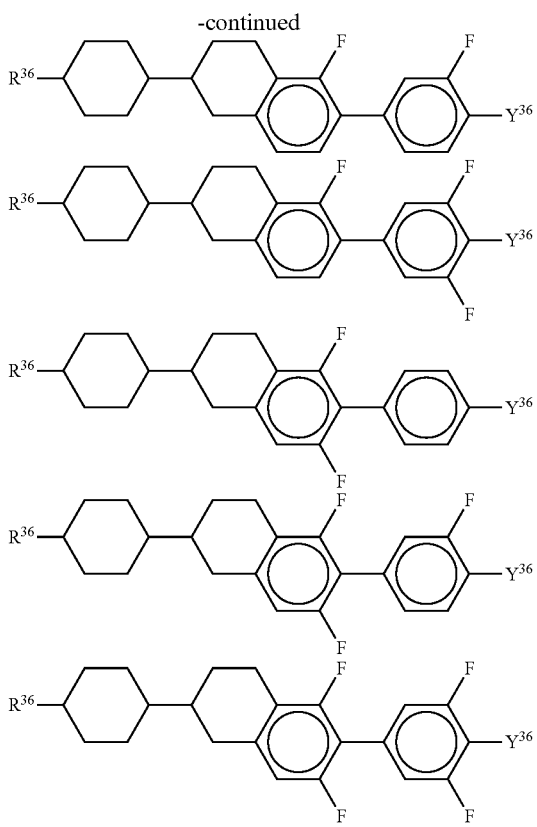

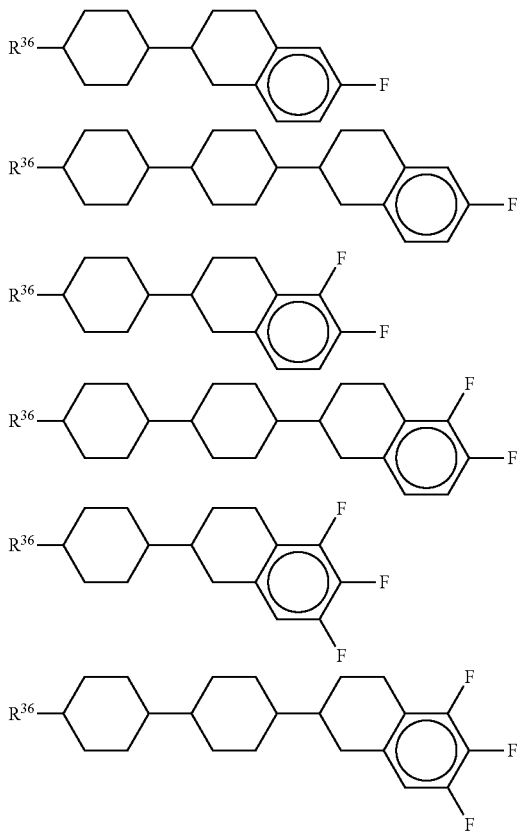

(In the formulae, $R^{36}$ represents an alkyl group having 1 to 8 carbon atoms, an alkoxyl group having 1 to 8 carbon atoms, or an alkenyl group having 2 to 8 carbon atoms; and $Y^{36}$ represents a cyano group, a fluorine atom, a chlorine atom, a trifluoromethyl group, a fluoromethoxy group, a difluoromethoxy group, or a trifluoromethoxy group.)

One or more compounds selected from the group consisting of the compounds represented by the general formulae (IIIa), (IIIb), and (IIIc) are contained, 1 to 10 of the compounds are preferably contained, and 2 to 8 of the compounds are particularly preferably contained. The lower limit of the content of the compounds represented by the general formulae (IIIa), (IIIb), and (IIIc) is preferably 5% by mass, more preferably 10% by mass, and further preferably 20% by mass. The upper limit of the content is preferably 80% by mass, more preferably 70% by mass, further preferably 60% by mass, and particularly preferably 50% by mass.

In the compounds represented by the general formulae (IVa), (IVb), and (IVc), $R^{41}$, $R^{42}$, $R^{43}$, $R^{44}$, $R^{45}$ and $R^{46}$ preferably each independently represent an alkyl group having 1 to 10 carbon atoms or an alkenyl group having 2 to 10 carbon atoms, or a linear alkyl group having 1 to 15 carbon atoms or an alkenyl group having 2 to 15 carbon atoms (one methylene group or two or more methylene groups that are not adjacent to each other in these groups may be substituted with —O— or —S—, and at least one hydrogen atom in these groups may be substituted with a fluorine atom or a chlorine atom); more preferably a linear alkyl group having 1 to 10 carbon atoms, a linear alkoxy group having 1 to 10 carbon atoms, or an alkenyl group having 2 to 10 carbon atoms; and particularly preferably a linear alkyl group having 1 to 8 carbon atoms or an alkoxy group having 1 to 8 carbon atoms. $M^{41}$, $M^{42}$, $M^{43}$, $M^{44}$, $M^{45}$, $M^{46}$, $M^{47}$, $M^{48}$, and $M^{49}$ preferably each independently represent a trans-1,4-cyclohexylene group (one methylene group or two or more methylene groups that are not adjacent to each other in this group may be substituted with —O— or —S—), a 1,4-phenylene group (one —CH= or two or more —CH= that are not adjacent to each other in this group may be substituted with a nitrogen atom), a 1,4-cyclohexenylene group, a 1,4-bicyclo(2.2.2)octylene group, a piperidine-2,5-diyl group, a naphthalene-2,6-diyl group, a 1,2,3,4-tetrahydronaphthalene-2,6-diyl group, or a decahydronaphthalene-2,6-diyl group (a hydrogen atom in these groups may be substituted with a cyano group, a fluorine atom, a trifluoromethyl group, a trifluoromethoxy group, or a chlorine atom); more preferably a trans-1,4-cyclohexylene group, a 1,4-phenylene group, a 3-fluoro-1,4-phenylene group, or a 2,3-difluoro-1,4-phenylene group; further preferably a trans-1,4-cyclohexylene group or a 1,4-phenylene group; and particularly preferably a trans-1,4-cyclohexylene group. $L^{41}$, $L^{42}$, $L^{43}$, $L^{44}$, $L^{45}$, $L^{46}$, $L^{47}$, $L^{48}$ and $L^{49}$ preferably each independently represent a single bond, —CH$_2$CH$_2$—, —(CH$_2$)$_4$—, —OCO—, —COO—, —OCH$_2$, CH$_2$O—, —OCF$_2$—, —CF$_2$O—, or —C≡C—; and more preferably a single bond, —CH$_2$CH$_2$—, —OCH$_2$—, or —CH$_2$O—. $X^{41}$, $X^{42}$, $X^{43}$, $X^{44}$, $X^{45}$, $X^{46}$, and $X^{47}$ each independently represent a hydrogen atom or a fluorine atom; G represents a methylene group or —O—; u, v, w, x, y, and z each independently represent 0, 1, or 2, where u+v, w+x, and y+z are each 2 or less.

Specifically, the compound represented by the general formula (IVa) preferably has the following structure represented by general formula (IVa-1).

[Chem. 33]

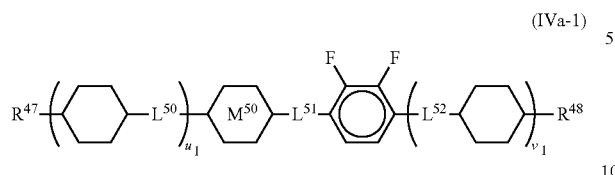
(IVa-1)

(In the formula, $R^{47}$ and $R^{48}$ each independently represent an alkyl group having 1 to 8 carbon atoms, an alkoxyl group having 1 to 8 carbon atoms, or an alkenyl group having 2 to 8 carbon atoms; $L^{50}$, $L^{51}$, and $L^{52}$ each independently represent a single bond, —CH$_2$CH$_2$—, —(CH$_2$)$_4$—, —OCH$_2$—, —CH$_2$O—, —OCF$_2$—, —CF$_2$O—, or —C≡C—; $M^{50}$ represents a 1,4-phenylene group or a trans-1,4-cyclohexylene group; and u$_1$ and v$_2$ each independently represent 0 or 1.)

More specifically, the compound represented by the general formula (IVa) preferably has the following structures represented by general formulae (IVa-2a) to (IVa-3i).

[Chem. 34]

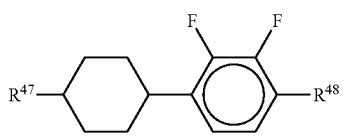
(IVa-2a)

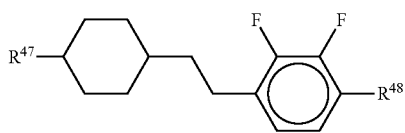
(IVa-2b)

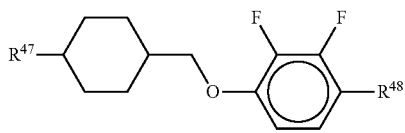
(IVa-2c)

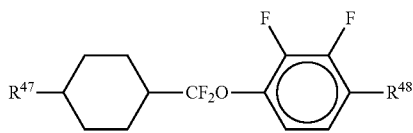
(IVa-2d)

[Chem. 35]

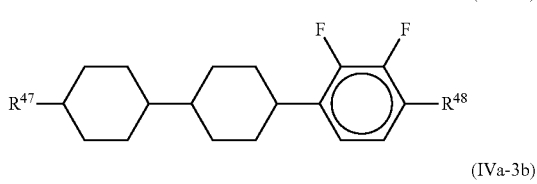
(IVa-3a)

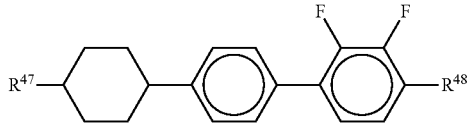
(IVa-3b)

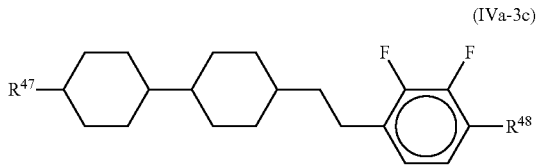
(IVa-3c)

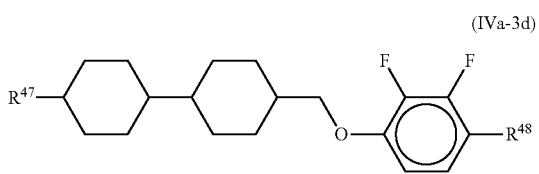
(IVa-3d)

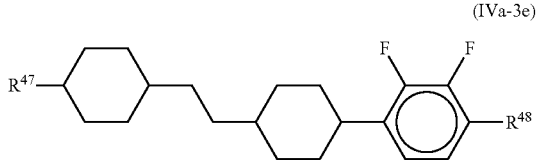
(IVa-3e)

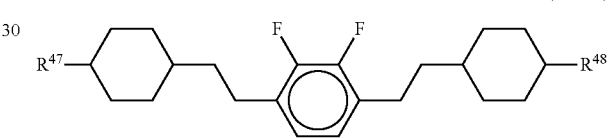
(IVa-3f)

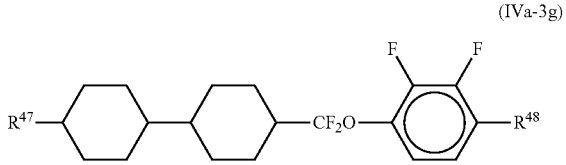
(IVa-3g)

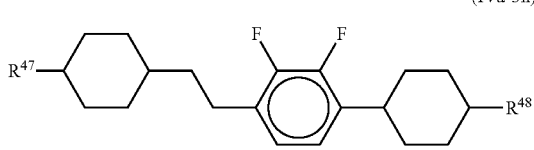
(IVa-3h)

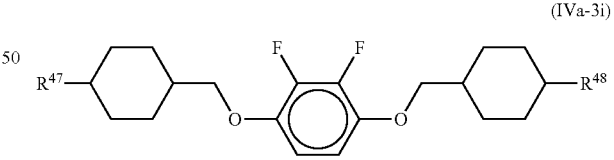
(IVa-3i)

(In the formulae, $R^{47}$ and $R^{48}$ each independently represent an alkyl group having 1 to 8 carbon atoms, an alkoxyl group having 1 to 8 carbon atoms, or an alkenyl group having 2 to 8 carbon atoms.) The compound represented by the general formula (IVa) more preferably has a structure in which $R^{47}$ and $R^{48}$ each independently represent an alkyl group having 1 to 8 carbon atoms or an alkoxyl group having 1 to 8 carbon atoms.

Specifically, the compound represented by the general formula (IVb) preferably has the following structure represented by general formula (IVb-1) below.

[Chem. 36]

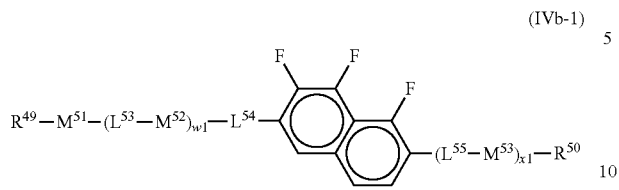
(IVb-1)

(In the formula, $R^{49}$ and $R^{50}$ each independently represent an alkyl group having 1 to 8 carbon atoms, an alkoxyl group having 1 to 8 carbon atoms, or an alkenyl group having 2 to 8 carbon atoms; $L^{52}$, $L^{53}$, and $L^{54}$ each independently represent a single bond, —$CH_2CH_2$—, —$(CH_2)_4$—, —$OCH_2$—, —$CH_2O$—, —$OCF_2$—, —$CF_2O$—, or —C≡C—; $M^{51}$, $M^{52}$, and $M^{53}$ each represent a 1,4-phenylene group or a trans-1,4-cyclohexylene group; and w1 and x1 each independently represent 0, 1, or 2, where w1+x1 is 2 or less.)

More specifically, the compound represented by the general formula (IVb) preferably has the following structures represented by general formulae (IVb-2a) to (IVb-3f).

[Chem. 37]

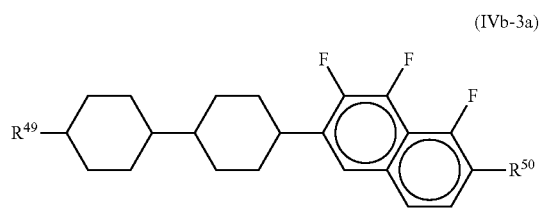
(IVb-2a)

(IVb-2b)

(IVb-2c)

(IVb-2d)

(IVb-2e)

[Chem. 38]

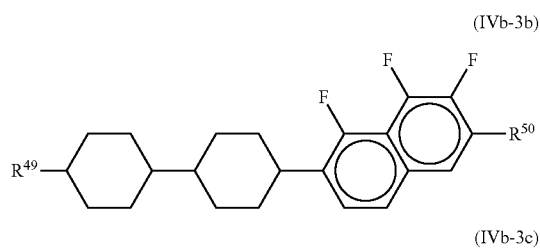
(IVb-3a)

(IVb-3b)

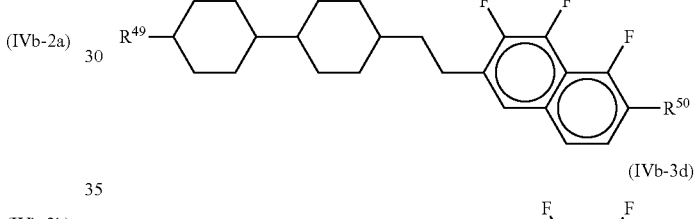
(IVb-3c)

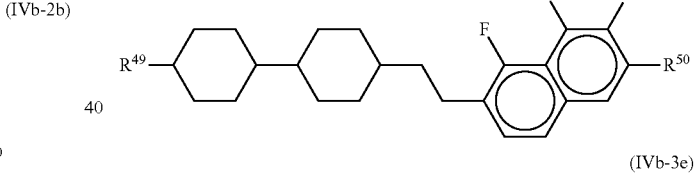
(IVb-3d)

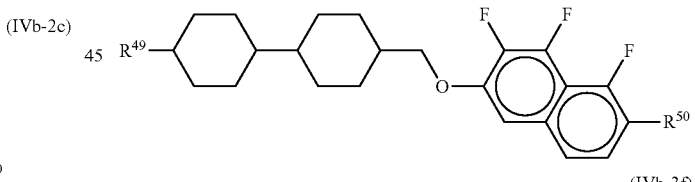
(IVb-3e)

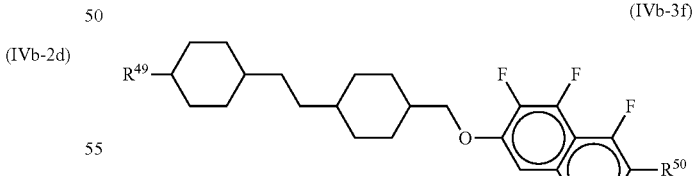
(IVb-3f)

(In the formulae, $R^{49}$ and $R^{50}$ each independently represent an alkyl group having 1 to 8 carbon atoms, an alkoxyl group having 1 to 8 carbon atoms, or an alkenyl group having 2 to 8 carbon atoms.)

Specifically, the compound represented by the general formula (IVc) preferably has the following structures represented by general formulae (IVc-1a) and (IVc-1b) below.

[Chem. 39]

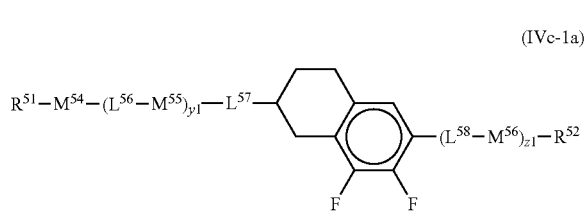
(IVc-1a)

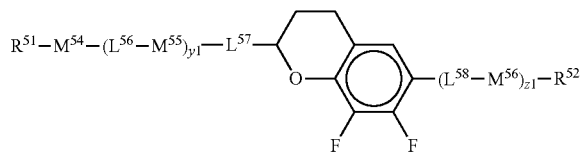
(IVc-1b)

(In the formulae, $R^{51}$ and $R^{52}$ each independently represent an alkyl group having 1 to 8 carbon atoms, an alkoxyl group having 1 to 8 carbon atoms, or an alkenyl group having 2 to 8 carbon atoms; $L^{56}$, $L^{57}$, and $L^{58}$ each independently represent a single bond, —CH$_2$CH$_2$—, —(CH$_2$)$_4$—, —OCH$_2$—, —CH$_2$O—, —OCF$_2$—, —CF$_2$O—, or —C≡C—; $M^{54}$, $M^{55}$, and $M^{56}$ each represent a 1,4-phenylene group or a trans-1,4-cyclohexylene group; and y1 and z1 each independently represent 0, 1, or 2, where y1+z1 is 2 or less.)

More specifically, the following structures represented by general formulae (IVc-2a) to (IVc-2g) below are also preferable.

[Chem. 40]

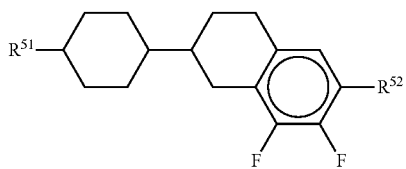
(IVc-2a)

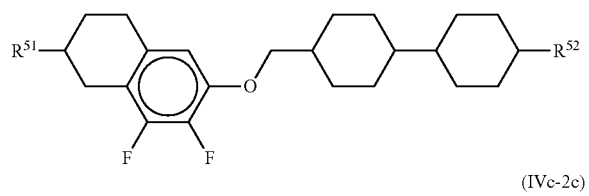
(IVc-2b)

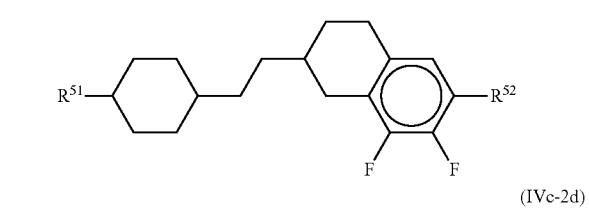
(IVc-2c)

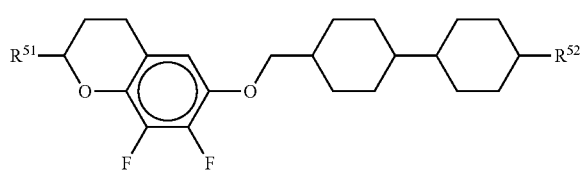
(IVc-2d)

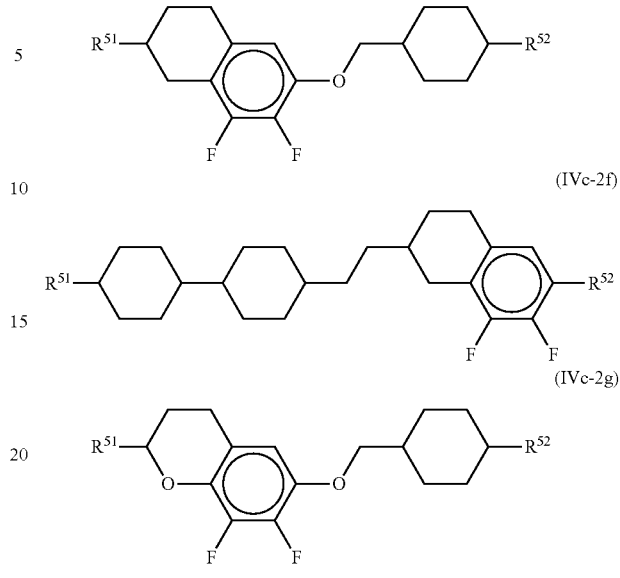
(IVc-2e)

(IVc-2f)

(IVc-2g)

(In the formulae, $R^{51}$ and $R^{52}$ each independently represent an alkyl group having 1 to 8 carbon atoms, an alkoxyl group having 1 to 8 carbon atoms, or an alkenyl group having 2 to 8 carbon atoms.)

One or more compounds selected from the group consisting of the compounds used as third components and represented by the general formulae (IIIa), (IIIb), and (IIIc) or selected from the group consisting of the compounds represented by the general formulae (IVa), (IVb), and (IVc) are contained, 2 to 10 of the compounds are preferably contained, and 2 to 8 of the compounds are particularly preferably contained. The lower limit of the content of the compounds is preferably 5% by mass, more preferably 10% by mass, and further preferably 20% by mass. The upper limit of the content is preferably 80% by mass, more preferably 70% by mass, further preferably 60% by mass, and particularly preferably 50% by mass.

In the liquid crystal composition of the present invention, Δn is preferably in the range of 0.08 to 0.25.

In the liquid crystal composition of the present invention, a liquid crystal composition having positive or negative Δε can be used depending on the display mode of the liquid crystal display element. In liquid crystal display elements with an MVA mode, a liquid crystal composition having negative Δε is used. In this case, Δε is preferably −1 or less and more preferably −2 or less.

The liquid crystal composition of the present invention has a wide liquid crystal phase temperature range (the absolute value of a difference between the liquid crystal phase lower limit temperature and the liquid crystal phase upper limit temperature), and the liquid crystal phase temperature range is preferably 100° C. or more and more preferably 120° C. or more. The liquid crystal phase upper limit temperature is preferably 70° C. or more and more preferably 80° C. or more. The liquid crystal phase lower limit temperature is preferably −20° C. or less and more preferably −30° C. or less.

The liquid crystal composition of the present invention may contain a typical nematic liquid crystal, smectic liquid crystal, cholesteric liquid crystal, or the like, in addition to the above-described compounds.

The polymerization of the liquid crystal composition containing a polymerizable compound according to the present invention proceeds even if a polymerization initiator is not present. However, the liquid crystal composition may contain a polymerization initiator to facilitate polymerization. Examples of the polymerization initiator include benzoin ethers, benzophenones, acetophenones, benzyl ketals, and acylphosphine oxides.

To improve the storage stability, the liquid crystal composition of the present invention may contain a stabilizer. Examples of the stabilizer that can be used include hydroquinones, hydroquinone monoalkyl ethers, tertiary butyl catechols, pyrogallols, thiophenols, nitro compounds, β-naphthylamines, β-naphthols, and nitroso compounds. If the stabilizer is used, the content of the stabilizer is preferably 0.005 to 1% by mass, more preferably 0.02 to 0.5% by mass, and particularly preferably 0.03 to 0.1% by mass relative to the liquid crystal composition.

To the liquid crystal composition of the present invention, a liquid crystal alignment capability is provided by polymerization of the polymerizable compound contained in the liquid crystal composition. The liquid crystal composition is used in a liquid crystal display element in which the amount of transmitted light is controlled by using the birefringence of the liquid crystal composition. The liquid crystal composition is useful for liquid crystal display elements, such as an AM-LCD (active-matrix liquid crystal display element), a TN (nematic liquid crystal display element), an STN-LCD (super twisted nematic liquid crystal display element), an OCB-LCD, and an IPS-LCD (in-plane-switching liquid crystal display element). The liquid crystal composition is particularly useful for an AM-LCD, and can be used in a transmissive or reflective liquid crystal display element.

Two substrates of a liquid crystal cell used in a liquid crystal display element may be composed of glass or a flexible transparent material such as a plastic material. One of the substrates may be composed of an opaque material such as silicon. A transparent substrate having a transparent electrode layer can be produced by, for example, sputtering indium tin oxide (ITO) onto a transparent substrate such as a glass plate.

A color filter can be produced by, for example, a pigment dispersion method, a printing method, an electrodeposition method, or a staining method. For example, a method for producing a color filter by a pigment dispersion method will be described. A curable coloring composition for color filters is applied onto the above-mentioned transparent substrate, and is then patterned. The curable coloring composition is then cured by heating or light irradiation. These steps are performed for each of three colors of red, green, and blue. Thus, pixel portions for the color filter can be formed. Furthermore, pixel electrodes each including an active element such as a TFT, a thin-film diode, or a metal-insulator-metal specific resistance element may be provided on the substrate.

The substrates are arranged so as to face each other such that the transparent electrode layer is disposed inside. In this step, the gap between the substrates may be adjusted by providing a spacer therebetween. In this case, the gap is preferably adjusted so that the thickness of a light-modulating layer to be obtained is in the range of 1 to 100 μm, and more preferably 1.5 to 10 μm. When a polarizing plate is used, the product of the optical anisotropy Δn of liquid crystals and a cell thickness d is preferably adjusted so that the maximum contrast is achieved. When two polarizing plates are provided, the adjustment may also be performed so that a satisfactory angle of view or contrast can be achieved by adjusting the polarizing axis of each of the polarizing plates. Furthermore, a retardation film for widening the angle of view may also be used. Examples of the spacer include glass particles, plastic particles, alumina particles, and photoresist materials. Subsequently, a sealant composed of an epoxy thermosetting composition or the like is applied onto the substrate by screen printing with a liquid-crystal injection port formed in the sealant. The substrates are then bonded to each other, and the sealant is thermally cured by heating.

A polymer-stabilized liquid crystal composition can be interposed between the two substrates by a typical vacuum injection method, an ODF method, or the like.

Since rapid progress of polymerization is desirable, the polymerizable compound is preferably polymerized by applying an active energy ray such as ultraviolet light or an electron beam. In the case where ultraviolet light is used, either a polarized light source or an unpolarized light source may be used. When polymerization is performed in a state in which the liquid crystal composition is interposed between two substrates, at least a substrate on the irradiation surface side needs to have transparency appropriate for the active energy ray. Alternatively, only specific portions may be polymerized using a mask during light irradiation, and then unpolymerized portions may be polymerized by further applying an active energy ray while changing the alignment state of the unpolymerized portions by changing a condition such as electric field, magnetic field, or temperature. In particular, when ultraviolet exposure is performed, the ultraviolet exposure is preferably performed while applying an alternating current to the liquid crystal composition containing a polymerizable compound. The alternating current applied preferably has a frequency of 10 Hz to 10 kHz and more preferably 60 Hz to 10 kHz. The voltage is selected in accordance with a desired pretilt angle of the liquid crystal display element. In other words, the pretilt angle of the liquid crystal display element can be controlled in accordance with the voltage applied. In liquid crystal display elements with an MVA mode, the pretilt angle is preferably controlled to be 80 to 89 degrees in terms of alignment stability and contrast.

The temperature during the irradiation is preferably within a temperature range in which the liquid crystal state of the liquid crystal composition of the present invention is maintained. Polymerization is preferably performed at a temperature close to room temperature, that is, typically at a temperature of 15 to 35° C. A metal halide lamp, a high-pressure mercury lamp, an ultrahigh-pressure mercury lamp, or the like can be used as a lamp for generating ultraviolet light. Regarding the wavelength of ultraviolet light, it is preferable to perform irradiation with ultraviolet light in a wavelength range other than an absorption wavelength range of the liquid crystal composition. It is preferable that a particular wavelength range of ultraviolet light be cut off as required, and the remaining ultraviolet wavelength range be used. The intensity of ultraviolet light is preferably 0.1 mW/cm$^2$ to 100 W/cm$^2$ and more preferably 2 mW/cm$^2$ to 80 W/cm$^2$. The amount of irradiation energy of the ultraviolet light can be appropriately adjusted, and is preferably 10 to 10000 mJ/cm$^2$ and more preferably 100 to 7000 mJ/cm$^2$. During the irradiation with ultraviolet light, the intensity of the ultraviolet light may be changed. The ultraviolet-irradiation time is appropriately selected in accordance with the intensity of the ultraviolet light, and is preferably 10 to 600 seconds.

EXAMPLES

The present invention will now be further described in detail based on Examples, but is not limited to Examples. In the following compositions of Examples and Comparative Examples, "%" means "% by mass".

Physical properties of liquid crystal compositions are shown as follows.

$T_{N-I}$: Liquid crystal phase upper limit temperature, which is nematic phase-isotropic liquid phase transition temperature (° C.)

Δε: Dielectric anisotropy

Δn: Optical anisotropy

Vth: Applied voltage (threshold voltage) at which the transmittance is changed by 10% when a square wave with a frequency of 1 kHz is applied (Method for Measuring Amount of Residual Monomer after UV Curing)

A liquid crystal composition was injected into a liquid crystal cell, and the cell was then irradiated with UV light to polymerize a polymerizable compound. Subsequently, the liquid crystal cell was disassembled, and an acetonitrile solution of an elution component containing a liquid crystal material, a polymerized product, and an unpolymerized polymerizable compound was obtained. This solution was analyzed by high-performance liquid chromatography (column: developing solvent: acetonitrile) to measure the peak area of each component. The amount of residual polymerizable compound was determined from the ratio of the peak area of the unpolymerized polymerizable compound to the peak area of a liquid crystal material used as an indicator. The amount of residual monomer was determined from this value and the amount of polymerizable compound initially added. The detection limit of the amount of residual polymerizable compound was 1000 ppm.

Example 1

A liquid crystal composition LC-1 containing compounds selected from the compounds represented by the general formula (II) and compounds selected from the compounds represented by the general formulae (IIIa), (IIIb), and (IIIc) or compounds selected from the compounds represented by the general formulae (IVa), (IVb), and (IVc) was prepared. The compounds constituting the liquid crystal composition LC-1 and the contents of the compounds are shown below.

[Chem. 41]

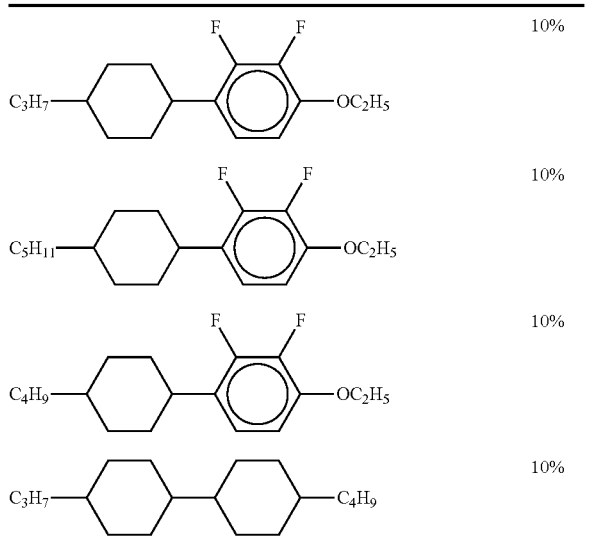

[Chem. 41]

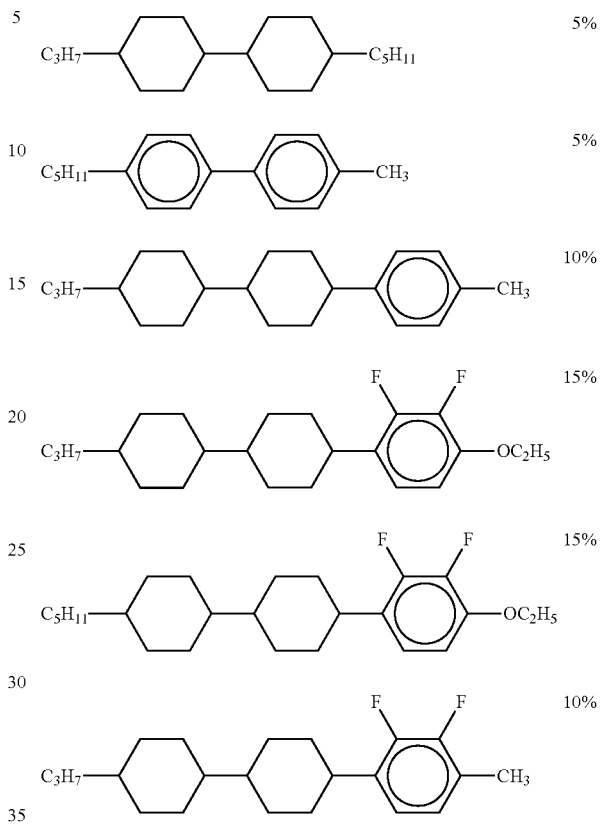

Table 1 shows the physical properties of the liquid crystal composition LC-1.

TABLE 1

| $T_{N-I}$ (° C.) | 80 |
|---|---|
| Δε | −3.5 |
| Δn | 0.087 |

A polymerizable liquid crystal composition CLC-1 was prepared by adding 0.3% of a polymerizable compound represented by formula (I-4-a) to 99.7% of the liquid crystal composition LC-1 and uniformly dissolving the polymerizable compound.

[Chem. 42]

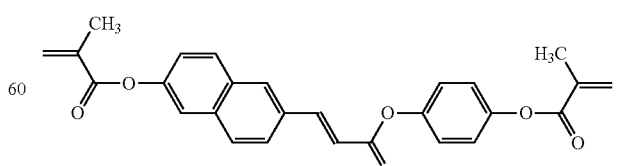

(I-4-a)

The physical properties of the CLC-1 were substantially the same as those of the LC-1. Thus, it was found that the compound represented by the formula (I-4-a) did not degrade the liquid crystallinity of the liquid crystal composition. In addition, when the liquid crystal composition was stored in a cold place (−20° C.) for a week, no deposition occurred. Thus, it was also found that the polymerizable compound had high compatibility with other liquid crystal compounds.

The CLC-1 was injected, by a vacuum injection method, into a cell with ITO, the cell having a cell gap of 3.5 μm and including polyimide alignment layers that induce a homeotropic alignment. The pretilt angle of this cell was measured (by a crystal rotation method), and then the liquid crystal cell was irradiated with ultraviolet light using a high-pressure mercury lamp through a filter that cuts off ultraviolet light with a wavelength of 320 nm or less while a square wave of 1.8 V was applied at a frequency of 1 kHz. The irradiation was performed for 600 seconds while the irradiation intensity on the surface of the cell was adjusted to 10 mW/cm$^2$ to obtain a homeotropic alignment liquid crystal display element in which the polymerizable compound in the polymerizable liquid crystal composition was polymerized. Table 2 shows the pretilt angles of the element measured before and after the ultraviolet irradiation and an electro-optic property of the element.

TABLE 2

| | |
|---|---|
| Pretilt angle before ultraviolet irradiation | 89.5 |
| Pretilt angle after ultraviolet irradiation | 87.5 |
| Vth (V) | 2.41 |

It was found from the results of pretilt angles that an alignment controlling force exerted on liquid crystal compounds was generated by polymerizing the polymerizable compound, and a homeotropic alignment liquid crystal display element in which a pretilt angle was fixed while liquid crystal molecules were tilted at 2.8 degrees with respect to the vertical direction was obtained.

The content of an unpolymerized compound represented by the formula (I-4-a) and contained in the element was analyzed by liquid chromatography, but the compound was not detected. Thus, it was confirmed that the polymerizable compound represented by the formula (I-4-a) could be polymerized without using a polymerization initiator, and that the content of an unpolymerized material left after the polymerization was equal to or less than the detection limit.

Comparative Example 1

A polymerizable liquid crystal composition CLC-A was prepared by adding 0.3% of a polymerizable compound represented by formula (A) to 99.7% of the liquid crystal composition LC-1 and uniformly dissolving the polymerizable compound.

[Chem. 43]

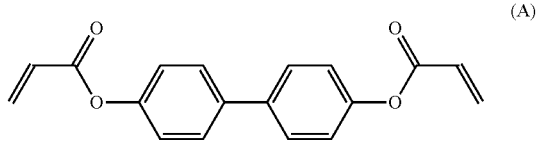

(A)

The CLC-A was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V was applied at a frequency of 1 kHz. The irradiation was performed for 600 seconds while the irradiation intensity on the surface of the cell was adjusted to 10 mW/cm$^2$ to obtain a homeotropic alignment liquid crystal display element in which the polymerizable compound in the polymerizable liquid crystal composition was polymerized. The pretilt angle before the ultraviolet irradiation in the element was 89.6 degrees whereas the pretilt angle after the ultraviolet irradiation was 89.5 degrees, which meant that there was no change in pretilt angle and liquid crystal molecules were hardly tilted with respect to the vertical direction. From the results of liquid chromatography, the content of an unpolymerized compound represented by the formula (A) and contained in the element was the same as the content of the polymerizable compound before the ultraviolet irradiation, which meant that the polymerization of the polymerizable compound (A) did not proceed.

Example 2

A polymerizable liquid crystal composition CLC-2 was prepared by adding 0.3% of a polymerizable compound represented by formula (I-7-a) to 99.7% of the liquid crystal composition LC-1 and uniformly dissolving the polymerizable compound.

[Chem. 44]

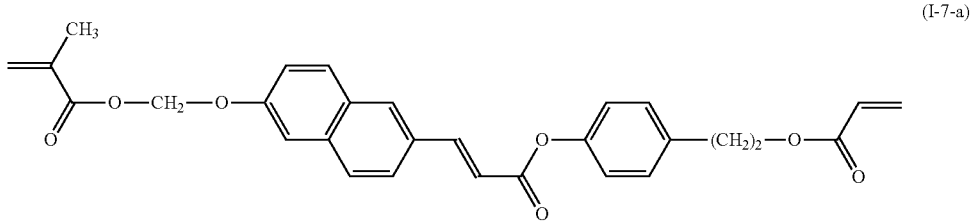

(I-7-a)

It was found that, as in the compound represented by the formula (I-4-a) in Example 1, the compound represented by the formula (I-7-a) also did not degrade the liquid crystallinity and had high compatibility.

The CLC-2 was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V was applied at a frequency of 1 kHz. The irradiation was performed for 600 seconds while the irradiation intensity on the surface of the cell was adjusted to 10 mW/cm² to obtain a homeotropic alignment liquid crystal display element in which the polymerizable compound in the polymerizable liquid crystal composition was polymerized. The pretilt angle before the ultraviolet irradiation in the element was 89.7 degrees whereas the pretilt angle after the ultraviolet irradiation was 87.3 degrees, which meant that the pretilt angle was fixed while liquid crystal molecules were tilted with respect to the vertical direction. The content of an unpolymerized compound represented by the formula (I-7-a) and contained in the element was analyzed by liquid chromatography, but the content was equal to or less than the detection limit. Thus, it was confirmed that the polymerizable compound represented by the formula (I-7-a) could be polymerized without using a polymerization initiator, and that the content of an unpolymerized material left after the polymerization was equal to or less than the detection limit.

Example 3

A polymerizable liquid crystal composition CLC-3 was prepared by adding 0.3% of a polymerizable compound represented by formula (I-8-a) to 99.7% of the liquid crystal composition LC-1 and uniformly dissolving the polymerizable compound.

[Chem. 45]

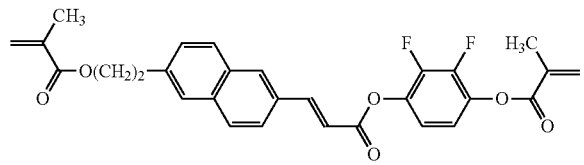

(I-8-a)

It was found that, as in the compound represented by the formula (I-4-a) in Example 1, the compound represented by the formula (I-8-a) also did not degrade the liquid crystallinity and had high compatibility.

The CLC-3 was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V was applied at a frequency of 1 kHz. The irradiation was performed for 600 seconds while the irradiation intensity on the surface of the cell was adjusted to 10 mW/cm² to obtain a homeotropic alignment liquid crystal display element in which the polymerizable compound in the polymerizable liquid crystal composition was polymerized. The pretilt angle before the ultraviolet irradiation in the element was 89.6 degrees whereas the pretilt angle after the ultraviolet irradiation was 87.5 degrees, which meant that the pretilt angle was fixed while liquid crystal molecules were tilted with respect to the vertical direction. The content of an unpolymerized compound represented by the formula (I-8-a) and contained in the element was analyzed by liquid chromatography, but the content was equal to or less than the detection limit. Thus, it was confirmed that the polymerizable compound represented by the formula (I-8-a) could be polymerized without using a polymerization initiator, and that the content of an unpolymerized material left after the polymerization was equal to or less than the detection limit.

Example 4

A polymerizable liquid crystal composition CLC-4 was prepared by adding 0.3% of a polymerizable compound represented by formula (I-58-a) to 99.7% of the liquid crystal composition LC-1 and uniformly dissolving the polymerizable compound.

[Chem. 46]

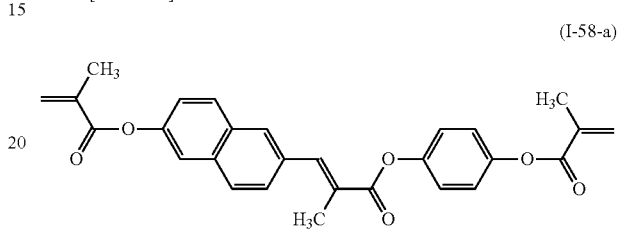

(I-58-a)

It was found that, as in the compound represented by the formula (I-4-a) in Example 1, the compound represented by the formula (I-58-a) also did not degrade the liquid crystallinity and had high compatibility.

The CLC-4 was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V was applied at a frequency of 1 kHz. The irradiation was performed for 600 seconds while the irradiation intensity on the surface of the cell was adjusted to 10 mW/cm² to obtain a homeotropic alignment liquid crystal display element in which the polymerizable compound in the polymerizable liquid crystal composition was polymerized. The pretilt angle before the ultraviolet irradiation in the element was 89.7 degrees whereas the pretilt angle after the ultraviolet irradiation was 87.2 degrees, which meant that the pretilt angle was fixed while liquid crystal molecules were tilted with respect to the vertical direction. The content of an unpolymerized compound represented by the formula (I-58-a) and contained in the element was analyzed by liquid chromatography, but the content was equal to or less than the detection limit. Thus, it was confirmed that the polymerizable compound represented by the formula (I-58-a) could be polymerized without using a polymerization initiator, and that the content of an unpolymerized material left after the polymerization was equal to or less than the detection limit.

Example 5

A liquid crystal composition LC-2 containing compounds selected from the compounds represented by the general formula (II) and compounds selected from the compounds represented by the general formulae (IIIa), (IIIb), and (IIIc) or compounds selected from the compounds represented by the general formulae (IVa), (IVb), and (IVc) was prepared. The liquid crystal composition LC-2 contained the following constituent components.

[Chem. 47]

C$_3$H$_7$—[Cy]—CH$_2$CH$_2$—[Ph(2,3-F$_2$)]—C$_2$H$_5$  10%

C$_4$H$_9$—[Cy]—CH$_2$CH$_2$—[Ph(2,3-F$_2$)]—C$_2$H$_5$  10%

C$_5$H$_{11}$—[Cy]—CH$_2$CH$_2$—[Ph(2,3-F$_2$)]—C$_2$H$_5$  10%

C$_3$H$_7$—[Cy]—[Cy]—C$_4$H$_9$  10%

C$_5$H$_{11}$—[Ph]—[Ph]—CH$_3$  10%

C$_3$H$_7$—[Cy]—[Cy]—[Ph]—CH$_3$  10%

C$_3$H$_7$—[Cy]—[Cy]—CH$_2$CH$_2$—[Ph(2,3-F$_2$)]—OC$_2$H$_5$  10%

C$_4$H$_9$—[Cy]—[Cy]—CH$_2$CH$_2$—[Ph(2,3-F$_2$)]—OC$_2$H$_5$  10%

C$_5$H$_{11}$—[Cy]—[Cy]—CH$_2$CH$_2$—[Ph(2,3-F$_2$)]—OC$_2$H$_5$  10%

C$_3$H$_7$—[Cy]—[Cy]—[Ph(2,3-F$_2$)]—OC$_2$H$_5$  10%

Table 3 shows the physical properties of the liquid crystal composition LC-2.

TABLE 3

| | |
|---|---|
| T$_{N-I}$ (° C.) | 85 |
| Δε | −3.4 |
| Δn | 0.094 |

A polymerizable liquid crystal composition CLC-5 was prepared by adding 0.3% of the polymerizable compound represented by the formula (I-4-a) to 99.7% of the liquid crystal composition LC-2 and uniformly dissolving the polymerizable compound. It was found that, as in Example 1, the liquid crystallinity was not degraded and high compatibility was achieved.

The CLC-5 was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V was applied at a frequency of 1 kHz. The irradiation was performed for 600 seconds while the irradiation intensity on the surface of the cell was adjusted to 10 mW/cm$^2$ to obtain a homeotropic alignment liquid crystal display element in which the polymerizable compound in the polymerizable liquid crystal composition was polymerized. The pretilt angle before the ultraviolet irradiation in the element was 89.5 degrees whereas the pretilt angle after the ultraviolet irradiation was 87.4 degrees, which meant that the pretilt angle was fixed while liquid crystal molecules were tilted with respect to the vertical direction. The content of an unpolymerized compound represented by the formula (I-4-a) and contained in the element was analyzed by liquid chromatography, but the content was equal to or less than the detection limit. Thus, it was confirmed that the polymerizable compound represented by the formula (I-4-a) could be polymerized without using a polymerization initiator, and that the content of an unpolymerized material left after the polymerization was equal to or less than the detection limit.

Example 6

A liquid crystal composition LC-3 containing compounds selected from the compounds represented by the general formula (II) and compounds selected from the compounds represented by the general formulae (IIIa), (IIIb), and (IIIc) or compounds selected from the compounds represented by the general formulae (IVa), (IVb), and (IVc) was prepared. The liquid crystal composition LC-3 contained the following constituent components.

[Chem. 48]

C$_5$H$_{11}$—[Cy]—CH$_2$—O—[Ph(2,3-F$_2$)]—OC$_2$H$_5$  10%

C$_3$H$_7$—[Cy]—CH$_2$—O—[chromane(F$_2$)]—C$_5$H$_{11}$  10%

C$_3$H$_7$—[Cy]—[Cy]—[Ph(2,3-F$_2$)]—OC$_2$H$_5$  10%

C$_5$H$_{11}$—[Cy]—[Cy]—[Ph(2,3-F$_2$)]—OC$_2$H$_5$  15%

-continued

[Chem. 48]

C₃H₇—⟨cyc⟩—⟨cyc⟩—C₄H₉   15%

C₃H₇—⟨cyc⟩—⟨cyc⟩—C₅H₁₁   15%

C₃H₇—⟨cyc⟩—⟨ar⟩—OC₂H₅   5%

C₅H₁₁—⟨ar⟩—⟨ar⟩—CH₃   10%

C₃H₇—⟨cyc⟩—⟨cyc⟩—⟨ar⟩—CH₃   10%

Table 4 shows the physical properties of the liquid crystal composition LC-3.

TABLE 4

| | |
|---|---|
| $T_{N-I}$ (° C.) | 72 |
| Δε | −3.3 |
| Δn | 0.086 |

A polymerizable liquid crystal composition CLC-6 was prepared by adding 0.3% of the polymerizable compound represented by the formula (I-4-a) to 99.7% of the liquid crystal composition LC-3 and uniformly dissolving the polymerizable compound. It was found that, as in Example 1, the liquid crystallinity was not degraded and high compatibility was achieved.

The CLC-6 was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V was applied at a frequency of 1 kHz. The irradiation was performed for 600 seconds while the irradiation intensity on the surface of the cell was adjusted to 10 mW/cm² to obtain a homeotropic alignment liquid crystal display element in which the polymerizable compound in the polymerizable liquid crystal composition was polymerized. The pretilt angle before the ultraviolet irradiation in the element was 89.6 degrees whereas the pretilt angle after the ultraviolet irradiation was 87.1 degrees, which meant that the pretilt angle was fixed while liquid crystal molecules were tilted with respect to the vertical direction. The content of an unpolymerized compound represented by the formula (I-4-a) and contained in the element was analyzed by liquid chromatography, but the content was equal to or less than the detection limit. Thus, it was confirmed that the polymerizable compound represented by the formula (I-4-a) could be polymerized without using a polymerization initiator, and that the content of an unpolymerized material left after the polymerization was equal to or less than the detection limit.

Example 7

A liquid crystal composition LC-4 containing compounds selected from the compounds represented by the general formula (II) and compounds selected from the compounds represented by the general formulae (IIIa), (IIIb), and (IIIc) or compounds selected from the compounds represented by the general formulae (IVa), (IVb), and (IVc) was prepared. The liquid crystal composition LC-4 contained the following constituent components.

[Chem. 49]

C₅H₁₁—⟨cyc⟩—⟨ar⟩—F   3%

C₅H₁₁—⟨cyc⟩—⟨ar(F,F)⟩   7%

C₃H₇—⟨cyc⟩—⟨cyc⟩—⟨ar⟩—F   2%

C₂H₅—⟨cyc⟩—⟨cyc⟩—⟨ar(F,F)⟩   7.5%

C₃H₇—⟨cyc⟩—⟨cyc⟩—⟨ar(F,F)⟩   7.5%

C₅H₁₁—⟨cyc⟩—⟨cyc⟩—⟨ar(F,F)⟩   7.5%

C₂H₅—⟨cyc⟩—⟨ar⟩—⟨ar(F)⟩—F   4%

C₃H₇—⟨cyc⟩—⟨ar⟩—⟨ar(F)⟩—F   4%

C₅H₁₁—⟨cyc⟩—⟨ar⟩—⟨ar(F)⟩—F   3%

-continued

[Chem. 49]

C₂H₅—[Cy]—[Cy]—[Ph(F,F,F)] 5%

C₃H₇—[Cy]—[Cy]—[Ph(F,F,F)] 5%

C₅H₁₁—[Cy]—[Cy]—[Ph(F,F,F)] 3.5%

C₂H₅—[Cy]—CH₂CH₂—[Cy]—[Ph(F,F)] 5%

C₃H₇—[Cy]—CH₂CH₂—[Cy]—[Ph(F,F)] 3%

C₅H₁₁—[Cy]—CH₂CH₂—[Cy]—[Ph(F,F)] 4%

C₂H₅—[Cy]—[Cy]—[Ph]—OCF₃ 4%

C₃H₇—[Cy]—[Cy]—[Ph]—OCF₃ 4%

C₄H₉—[Cy]—[Cy]—[Ph]—OCF₃ 4%

C₅H₁₁—[Cy]—[Cy]—[Ph]—OCF₃ 4%

C₃H₇—[Cy]—[Cy]—[Ph(F)]—OCF₃ 5%

C₃H₇—[Cy]—[Ph]—OC₂H₅ 3%

[Chem. 49]

C₃H₇—[Cy]—[Cy]—C₄H₉ 3%

C₃H₇—[Cy]—[Cy]—[Ph]—CH₃ 3%

Table 5 shows the physical properties of the liquid crystal composition LC-4.

TABLE 5

| $T_{N-I}$ (° C.) | 85 |
|---|---|
| $\Delta\epsilon$ | 5.5 |
| $\Delta n$ | 0.090 |

A polymerizable liquid crystal composition CLC-7 was prepared by adding 0.3% of the polymerizable compound represented by the formula (I-4-a) to 99.7% of the liquid crystal composition LC-4 and uniformly dissolving the polymerizable compound. It was found that, as in Example 1, the liquid crystallinity was not degraded and high compatibility was achieved.

The CLC-7 was injected, by a vacuum injection method, into a cell with ITO, the cell having a cell gap of 3.5 µm and including polyimide alignment layers that induce a parallel alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V was applied at a frequency of 1 kHz. The irradiation was performed for 600 seconds while the irradiation intensity on the surface of the cell was adjusted to 10 mW/cm² to obtain a homeotropic alignment liquid crystal display element in which the polymerizable compound in the polymerizable liquid crystal composition was polymerized. The pretilt angle before the ultraviolet irradiation in the element was 0.1 degrees whereas the pretilt angle after the ultraviolet irradiation was 3.2 degrees, which meant that the pretilt angle was fixed while liquid crystal molecules were tilted with respect to the horizontal direction. The content of an unpolymerized compound represented by the formula (I-4-a) and contained in the element was analyzed by liquid chromatography, but the content was equal to or less than the detection limit. Thus, it was confirmed that the polymerizable compound represented by the formula (I-4-a) could be polymerized without using a polymerization initiator, and that the content of an unpolymerized material left after the polymerization was equal to or less than the detection limit.

Example 8 and Comparative Example 2

A voltage was applied to the liquid crystal display elements after polymerization, the liquid crystal display elements being produced in Examples 1 to 7 and Comparative Example 1, and the state of image sticking was visually observed with elapsed time. (Symbol A represents that no change was observed. Symbol B represents that image sticking was observed. Herein, the image sticking becomes more severe as the number of symbol B increases.)

TABLE 6

| | After 10 hours | After 50 hours | After 100 hours | After 500 hours |
|---|---|---|---|---|
| Example 1 | A | A | A | A |
| Example 2 | | | | |
| Example 3 | | | | |
| Example 4 | | | | |
| Example 5 | | | | |
| Example 6 | | | | |
| Example 7 | | | | |
| Comparative Example 1 | | B | BB | BBB |

In the liquid crystal display element produced in Comparative Example 1, image sticking occurred after 48 hours from the start of display, and display failure was observed over the substantially entire surface after 168 hours. In contrast, in the liquid crystal display elements produced in Examples 1 to 7, a satisfactory display state was maintained even after 500 hours had passed. Accordingly, it was confirmed that liquid crystal display elements in which all polymerizable materials were polymerized and consumed as in the compounds of the present invention had high reliability. It was also found that the alignment controlling force did not decrease and the polymer had sufficiently high stiffness.

Industrial Applicability

The liquid crystal composition is useful as a liquid crystal material for liquid crystal display elements.

The invention claimed is:

1. A liquid crystal composition containing a polymerizable compound, comprising:
as a first component as the polymerizable compound, at least one compound selected from compounds represented by general formula (I)

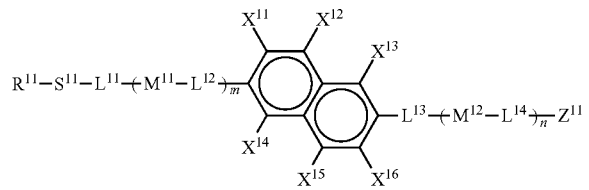

(I)

wherein $R^{11}$ is selected from structures represented by formulae (R-1) to (R-15) below,

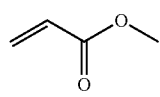 (R-1)

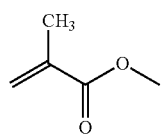 (R-2)

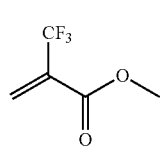 (R-3)

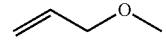 (R-4)

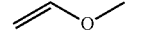 (R-5)

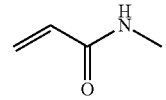 (R-6)

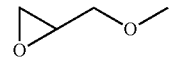 (R-7)

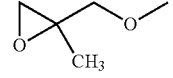 (R-8)

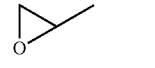 (R-9)

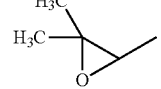 (R-10)

 (R-11)

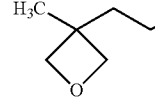 (R-12)

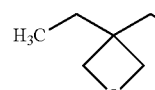 (R-13)

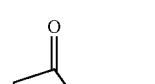 (R14)

 (R-15)

$S^{11}$ represents a single bond or an alkylene group having 1 to 12 carbon atoms, where a methylene group in the alkylene group may be substituted with an oxygen atom, —COO—, —OCO—, or —OCOO— as long as oxygen atoms are not directly bonded to each other, $Z^{11}$ represents a hydrogen atom, a fluorine atom, a chlorine atom, a cyano group, a thiocyanate group, a trifluoromethoxy group, a trifluoromethyl group, a difluoromethoxy group, an alkyl group having 1 to 12 carbon atoms, where a methylene group in the alkyl group may be substituted with an oxygen atom, a sulfur atom, —CO—, —COO—, —OCO—, —OCOO—, —CH=CH—, or —C≡C— as long as —O—O—, —O—S—, and —S—S— are not formed, or —S$^{12}$—R$^{12}$ wherein R$^{12}$ independently has the same meaning as R$^{11}$, and S$^{12}$ independently has the same meaning as S$^{11}$, $X^{11}$, $X^{12}$, $X^{13}$, $X^{14}$, $X^{15}$, and $X^{16}$ each independently represent a hydrogen atom, an alkyl group, an alkyl halide group, an alkoxy group, an alkoxy halide group, a halogen, a cyano group, or a nitro group, m represents 0 or 1 and n represents 1, 2, or 3, $L^{11}$, $L^{12}$, and $L^{14}$ each independently represent a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —CONR$^a$—, —NR$^a$—CO—, —SCH$_2$—, —CH$_2$S—, —CH=CH—OCO—, —COO—CH=CH—, —OCO—CH=CH—, —CH=CH—OCO—, —COOC$_2$H$_4$—, —OCOC$_2$H$_4$—, —C$_2$H$_4$OCO—, —C$_2$H$_4$COO—, —OCOCH$_2$—, —CH$_2$COO—, —CH=CH—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— (wherein $R^a$ represents an alkyl group having 1 to 4 carbon atoms), and when a plurality of $L^{12}$s are present, $L^{12}$s may be the same as or different from each other, and when a plurality of $L^{14}$s are present, $L^{14}$s may be the same as or different from each other, $L^{13}$ represents —CH=CQ-COO—, —CH=CQ-OCO—, —COO—CQ=CH—, or —OCO—CQ=CH— wherein Q represents a hydrogen atom or a methyl group, $M^{11}$ and $M^{12}$ each independently represent a 1,4-phenylene group, a 1,4-cyclohexylene group, a pyridine-2,5-diyl group, a pyrimidine-2,5-diyl group, a piperidine-2,5-diyl group, a naphthalene-2,6-diyl group, an indane-2,5-diyl group, a tetrahydronaphthalene-2,6-diyl group, or a 1,3-dioxane-2,5-diyl group, where hydrogen atoms in $M^{11}$ and $M^{12}$ may be each independently unsubstituted or substituted with a fluorine atom, a chlorine atom, a cyano group, an alkyl group having 1 to 8 carbon atoms, an alkyl halide group, an alkoxy halide group, an alkoxy group, or a nitro group, and when a plurality of $M^{11}$s are present, $M^{11}$s may be the same as or different from each other, and when a plurality of $M^{12}$s are present, $M^{12}$s may be the same as or different from each other;

as a second component as a non-polymerizable liquid crystal material, at least one compound represented by general formula (II)

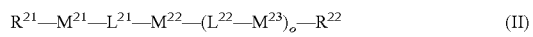

$$R^{21}-M^{21}-L^{21}-M^{22}-(L^{22}-M^{23})_o-R^{22} \quad (II)$$

wherein $R^{21}$ and $R^{22}$ each independently represent an alkyl group having 1 to 10 carbon atoms or an alkenyl group having 2 to 10 carbon atoms, where one methylene group or two or more methylene groups that are not adjacent to each other in these groups may be substituted with —O— or —S—, and at least one hydrogen atom in these groups may be substituted with a fluorine atom or a chlorine atom, o represents 0, 1, or 2, $M^{21}$, $M^{22}$, and $M^{23}$ each independently represent a group selected from (a) a trans-1,4-cyclohexylene group (one methylene group or two or more methylene groups that are not adjacent to each other in this group may be substituted with —O— or —S—), (b) a 1,4-phenylene group wherein one —CH= or two or more —CH= that are not adjacent to each other in this group may be substituted with a nitrogen atom, a 3-fluoro-1,4-phenylene group, and a 3,5-difluoro-1,4-phenylene group, and (c) a 1,4-cyclohexenylene group, a 1,4-bicyclo(2.2.2)octylene group, a piperidine-2,5-diyl group, a naphthalene-2,6-diyl group, a decahydronaphthalene-2,6-diyl group, and a 1,2,3,4-tetrahydronaphthalene-2,6-diyl group, and when a plurality of $M^{23}$s are present, $M^{23}$s may be the same as or different from each other, $L^{21}$ and $L^{22}$ each independently represent a single bond, —CH$_2$CH$_2$—, —(CH$_2$)$_4$—, —OCH$_2$—, —CH$_2$O—, —OCF$_2$—, —CF$_2$O—, —CH=CH—, —CH=N—N=CH—, or —C≡C—, and when a plurality of $L^{22}$s are present, $L^{22}$s may be the same as or different from each other; and as a third component having positive or negative $\Delta\epsilon$, at least one compound selected from the group consisting of compounds represented by general formulae (IIIa), (IIIb), and (IIIc) or the group consisting of compounds represented by general formulae (IVa), (IVb), and (IVc)

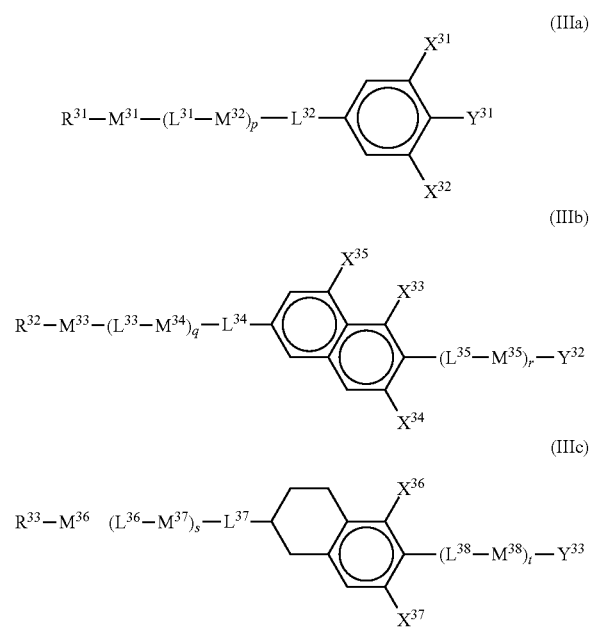

wherein $R^{31}$, $R^{32}$, and $R^{33}$ each independently represent an alkyl group having 1 to 10 carbon atoms or an alkenyl group having 2 to 10 carbon atoms, where one methylene group or two or more methylene groups that are not adjacent to each other in these groups may be substituted with —O— or —S—, and at least one hydrogen atom in these groups may be substituted with a fluorine atom or a chlorine atom, p, q, r, s, and t each independently represent 0, 1, or 2, where q +r and s +t are each 2 or less, $M^{31}$, $M^{32}$, $M^{33}$, $M^{34}$, $M^{35}$, $M^{36}$, $M^{37}$, and $M^{38}$ each independently represent a group selected from (d) a trans-1,4-cyclohexylene group wherein one methylene group or two or more methylene groups that are not adjacent to each other in this group may be substituted with —O— or —S—, (e) a 1,4-phenylene group wherein one —CH= or two or more —CH= that are not adjacent to each other in this group may be substituted with a nitrogen atom, a 3-fluoro-1,4-phenylene group, and a 3,5-difluoro-1,4-phenylene group, and (f) a 1,4-cyclohexenylene group, a 1,4-bicyclo(2.2.2)octylene group, a piperidine-2,5-diyl group, a naphthalene-2,6-diyl group, a 1,2,3,4-tetrahydronaphthalene-2,6-diyl group, and a decahydronaphthalene-2,6-diyl group, a hydrogen atom in the group (d), groups (e), or groups (f) may be substituted with a cyano group, a fluorine atom, a trifluoromethyl group, a trifluoromethoxy group, or a chlorine atom, and when a plurality of $M^{32}$s, $M^{34}$s, $M^{35}$s, $M^{37}$s, and/or $M^{38}$s are present, they may each be the same as or different from each other, $L^{31}$, $L^{32}$, $L^{33}$, $L^{34}$, $L^{35}$, $L^{36}$, $L^{37}$, and $L^{38}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, or —C≡C—, and when a plurality of $L^{31}$s, $L^{33}$s, $L^{35}$s, $L^{36}$s, and/or $L^{38}$s are present, they may each be the same as or different from each other, $X^{31}$, $X^{32}$, $X^{33}$, $X^{34}$, $X^{35}$, $X^{36}$, and $X^{37}$ each independently represent a hydrogen atom or a fluorine atom, $Y^{31}$, $Y^{32}$, and $Y^{33}$ each independently represent a fluorine atom, a chlorine atom, a cyano group, a thiocyanate group, a trifluoromethoxy group, a trifluoromethyl group, a 2,2,2-trifluoroethyl group, or a difluoromethoxy group,

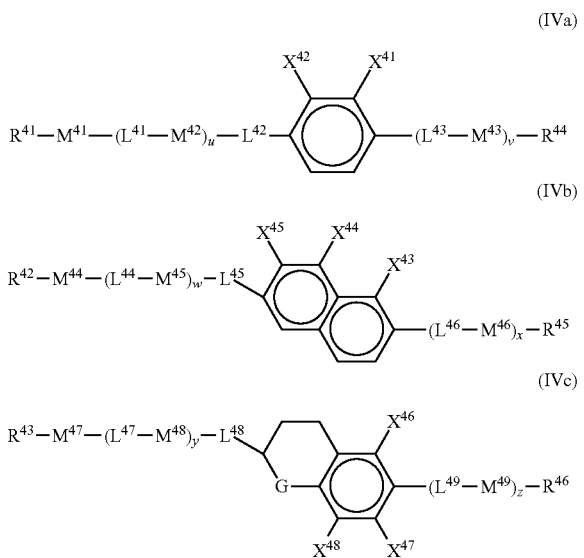

wherein $R^{41}$, $R^{42}$, $R^{43}$, $R^{44}$, $R^{45}$, and $R^{46}$ each independently represent an alkyl group having 1 to 10 carbon atoms or an alkenyl group having 2 to 10 carbon atoms, where one methylene group or two or more methylene groups that are not adjacent to each other in these groups may be substituted with —O— or —S—, and at least one hydrogen atom in these groups may be substituted with a fluorine atom or a chlorine atom, u, v, w, x, y, and z each independently represent 0, 1, or 2, where u +v, w +x, and y +z are each 2 or less, $M^{41}$, $M^{42}$, $M^{43}$, $M^{44}$, $M^{45}$, $M^{46}$, $M^{47}$, $M^{48}$, and $M^{49}$ each independently represent a group selected from (d) a trans-1,4-cyclohexylene group wherein one methylene group or two or more methylene groups that are not adjacent to each other in this group may be substituted with —O— or —S—, (e) a 1,4-phenylene group wherein one —CH= or two or more —CH= that are not adjacent to each other in this group may be substituted with a nitrogen atom, and (f) a 1,4-cyclohexenylene group, a 1,4-bicyclo(2.2.2)octylene group, a piperidine-2,5-diyl group, a naphthalene-2,6-diyl group, a 1,2,3,4-tetrahydronaphthalene-2,6-diyl group, and a decahydronaphthalene-2,6-diyl group, a hydrogen atom in the group (d), group (e), or groups (f) may be substituted with a cyano group, a fluorine atom, a trifluoromethyl group, a trifluoromethoxy group, or a chlorine atom, and when a plurality of $M^{42}$s, $M^{43}$s, $M^{45}$s, $M^{46}$s, $M^{48}$s, and/or $M^{49}$s are present, they may each be the same as or different from each other, $L^{41}$, $L^{42}$, $L^{43}$, $L^{44}$, $L^{45}$, $L^{46}$, $L^{47}$, $L^{48}$, and $L^{49}$ each independently represent a single bond, —COO—, —OCO— —CH$_2$CH$_2$—, —(CH$_2$)$_4$—, —OCH$_2$—, —CH$_2$O—, —OCF$_2$—, —CF$_2$O—, or —C≡C—, and when a plurality of $L^{41}$s, $L^{43}$s, $L^{44}$s, $L^{46}$s, $L^{47}$s, and/or $L^{49}$s are present, they may each be the same as or different from each other, $X^{41}$ and $X^{42}$ each independently represent a trifluoromethyl group, a trifluoromethoxy group, or a fluorine atom and $X^{43}$, $X^{44}$, $X^{45}$, $X^{46}$, $X^{47}$, and $X^{48}$ each independently represent a hydrogen atom, a trifluoromethyl group, a trifluoromethoxy group, or a fluorine atom, but one of $X^{41}$ and $X^{42}$ represents a fluorine atom, one of $X^{43}$, $X^{44}$, and $X^{45}$ represents a fluorine atom, and one of $X^{46}$, $X^{47}$ and $X^{48}$ represents a fluorine atom, where $X^{46}$ and $X^{47}$ do not represent fluorine atoms at the same time and $X^{46}$ and $X^{48}$ do not represent fluorine atoms at the same time, G represents a methylene group or —O—.

2. The liquid crystal composition containing a polymerizable compound according to claim 1, wherein in the general formula (I), $Z^{11}$ represents —$S^{12}$—$R^{12}$.

3. The liquid crystal composition containing a polymerizable compound according to claim 1 or 2, wherein in the general formula (I), $R^{11}$ and $R^{12}$ each independently represent the structure represented by the formula (R-1) or (R-2).

4. The liquid crystal composition containing a polymerizable compound according to claim 3, wherein the liquid crystal composition is used in a liquid crystal display element that has a structure in which a liquid crystal is interposed between a pair of substrates, that includes at least a transparent electrode and a polarizing plate, and to which a liquid crystal alignment capability is provided by polymerizing the polymerizable compound contained in the liquid crystal composition.

5. The liquid crystal composition containing a polymerizable compound according to claim 4, wherein the liquid crystal composition contains 0.01 to 2% by mass of the compound selected from the polymerizable compounds represented by the general formula (I), 5 to 70% by mass of the compound represented by the general formula (II), and 5 to 70% by mass of the compound selected from the group consisting of the compounds represented by the general formulae (IIIa), (IIb), and (IIIc) or the compound selected from the group consisting of the compounds represented by the general formulae (IVa), (IVb), and (IVc).

6. The liquid crystal composition containing a polymerizable compound according to claim 5, wherein the liquid crystal composition contains, as the third component, at least one compound selected from the group consisting of the compounds represented by the general formulae (IVa), (IVb), and (IVc).

7. A liquid crystal display element using the liquid crystal composition containing a polymerizable compound according to claim 6, wherein a liquid crystal alignment capability is provided by polymerizing the polymerizable compound contained in the liquid crystal composition.

8. The liquid crystal display element according to claim 7, wherein the liquid crystal composition containing a polymerizable compound has a negative dielectric anisotropy.

* * * * *